(12) United States Patent
Baker et al.

(10) Patent No.: US 12,149,038 B2
(45) Date of Patent: Nov. 19, 2024

(54) NANOPARTICLE DOPING FOR LASERS AND AMPLIFIERS OPERATING AT EYE-SAFER WAVELENGTHS, AND/OR EXHIBITING REDUCED STIMULATED BRILLOUIN SCATTERING

(71) Applicant: The Government of the United States, as represented by the Secretary of the Navy, Washington, DC (US)

(72) Inventors: Colin C. Baker, Alexandria, VA (US); Edward J. Friebele, Cheverly, MD (US); Woohong Kim, Lorton, VA (US); L. Brandon Shaw, Woodbridge, VA (US); Jasbinder S. Sanghera, Ashburn, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 69 days.

(21) Appl. No.: 17/354,466

(22) Filed: Jun. 22, 2021

(65) Prior Publication Data
US 2021/0313756 A1    Oct. 7, 2021

Related U.S. Application Data

(63) Continuation of application No. 15/783,836, filed on Oct. 13, 2017, now Pat. No. 11,043,785.
(Continued)

(51) Int. Cl.
*H01S 3/067* (2006.01)
*B82Y 20/00* (2011.01)
(Continued)

(52) U.S. Cl.
CPC .......... *H01S 3/06716* (2013.01); *C03C 13/04* (2013.01); *C03C 13/045* (2013.01);
(Continued)

(58) Field of Classification Search
None
See application file for complete search history.

(56) References Cited

U.S. PATENT DOCUMENTS

| | | | |
|---|---|---|---|
| 7,526,167 B1 * | 4/2009 | Minelly | G02B 6/03633 |
| | | | 359/341.3 |
| 8,655,129 B2 | 2/2014 | Tankala et al. | |

(Continued)

OTHER PUBLICATIONS

E.J. Friebele et al. "Erbium nanoparticle doped fibers for efficient, resonantly-pumped Er-doped fiber lasers" SPIE Photonics West Conference, Paper 9344-38 (Mar. 4, 2015).
(Continued)

*Primary Examiner* — Eric L Bolda
(74) *Attorney, Agent, or Firm* — US Naval Research Laboratory

(57) ABSTRACT

Methods for synthesizing fibers having nanoparticles therein are provided, as well as preforms and fibers incorporating nanoparticles. The nanoparticles may include one or more rare earth ions selected based on fluorescence at eye-safer wavelengths, surrounded by a low-phonon energy host. Nanoparticles that are not doped with rare earth ions may also be included as a co-dopant to help increase solubility of nanoparticles doped with rare earth ions in the silica matrix. The nanoparticles may be incorporated into a preform, which is then drawn to form fiber. The fibers may beneficially be incorporated into lasers and amplifiers that operate at eye safer wavelengths. Lasers and amplifiers incorporating the fibers may also beneficially exhibit reduced Stimulated Brillouin Scattering.

10 Claims, 13 Drawing Sheets

Related U.S. Application Data

(60) Provisional application No. 62/408,202, filed on Oct. 14, 2016.

(51) Int. Cl.
  *C03B 37/012* (2006.01)
  *C03C 13/04* (2006.01)
  *C03C 14/00* (2006.01)
  *H01S 3/16* (2006.01)
  *H01S 3/17* (2006.01)
  *B82Y 30/00* (2011.01)

(52) U.S. Cl.
  CPC .......... *C03C 14/006* (2013.01); *H01S 3/1603* (2013.01); *H01S 3/169* (2013.01); *H01S 3/176* (2013.01); *B82Y 20/00* (2013.01); *B82Y 30/00* (2013.01); *C03B 37/01208* (2013.01); *C03B 37/01262* (2013.01); *C03B 2201/34* (2013.01); *C03C 2214/16* (2013.01)

(56) References Cited

U.S. PATENT DOCUMENTS

| | | | |
|---|---|---|---|
| 8,958,674 | B2 | 2/2015 | Pastouret et al. |
| 2004/0187524 | A1* | 9/2004 | Sen ................. B82Y 30/00 65/390 |
| 2009/0207486 | A1* | 8/2009 | Burov ................. C03C 4/0071 359/341.5 |
| 2010/0142033 | A1* | 6/2010 | Regnier ................. C03C 3/095 977/773 |
| 2012/0148206 | A1 | 6/2012 | Boivin et al. |

OTHER PUBLICATIONS

W.J. Miniscalco "Optical and Electronic Properties of Rare Earth Ions in Glasses", Rare Earth Doped Fiber Lasers and Amplifiers, 2d ed., pp. 17-112, (2001).

A. Pastouret et al. "Nanoparticle Doping Process for Improved Fibre Amplifiers and Lasers," Proc. SPIE 7195 71951X-1-8 (2009).

D. Boivin et al. "Performance Characterization of New Erbium-doped Fibers using MCVD Nanoparticle Doping Process," Proc. SPIE 7914, 791423-1-11 (2011).

M.J. Weber "Probabilities for radiative and non-radiative decay of $Er^{3+}$ in $LaF_3$" Physical Review, 157, No. 3 pp. 262-273 (1967).

R.A. Motes "Introduction to high power fiber lasers", p. 117, Directed Energy Professional Society (2009).

M.-Jun Li et al. "Al/GE co-doped large mode area fiber with high SBS threshold" Optics Express 15 8290-8299 (2007).

P.D. Dragic et al. "Compositional tuning of glass for the suppression of nonlinear and parasitic fiber laser phenomena" Procs. of SPIE vol. 9081 908109-2 (2014).

P.D. Dragic et al. "The Brillouin gain coefficient of Yb-doped aluminosilicate glass optical fibers" Optical Materials 35 1627-1632 (2013).

S. Tammela et al. "Potential of Nanoparticle Technologies for Next Generation Erbium-Doped Fibers," OFC2004 Technical Digest, PBS (2004).

* cited by examiner

FIG. 2A
FIG. 2B
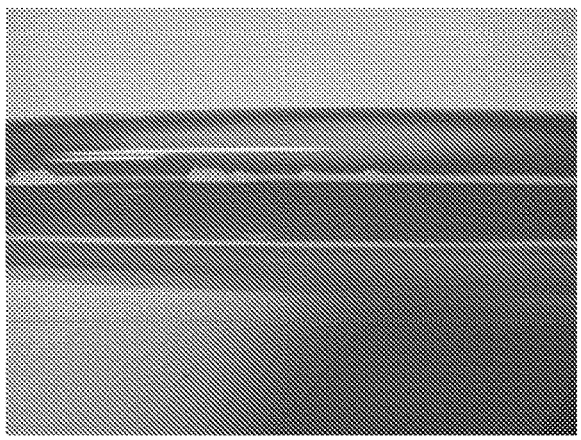
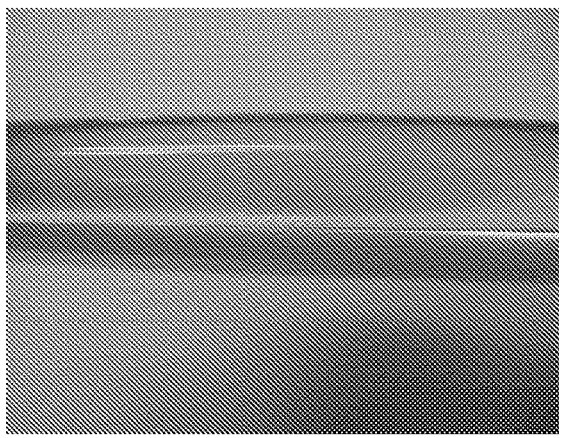

NANOPARTICLE DOPING FOR LASERS AND AMPLIFIERS OPERATING AT EYE-SAFER WAVELENGTHS, AND/OR EXHIBITING REDUCED STIMULATED BRILLOUIN SCATTERING

CROSS-REFERENCE TO RELATED APPLICATIONS

This application claims priority to U.S. Provisional Application No. 62/408,202, filed on Oct. 14, 2016, the contents of which are incorporated herein by reference in their entirety.

TECHNICAL FIELD

This application relates generally to methods for synthesizing fibers having nanoparticles therein, and preforms and fibers incorporating nanoparticles. The nanoparticles may include one or more rare earth ions selected based on fluorescence at eye-safer wavelengths, surrounded by a low-phonon energy host. Nanoparticles that are not doped with rare earth ions may also be included as a co-dopant to help increase solubility of nanoparticles doped with rare earth ions in the silica matrix. The nanoparticles may be incorporated into a preform, which is then drawn to form fiber. The fibers may beneficially be incorporated into lasers and amplifiers that operate at eye safer wavelengths. Lasers and amplifiers incorporating the fibers may also beneficially exhibit reduced Stimulated Brillouin Scattering.

BACKGROUND OF THE INVENTION

Optical fibers may be doped with ions in order to affect properties such as operating wavelength and energy. In conventional doping of rare earth ions for fiber lasers and amplifiers, rare earth (RE) salts and aluminum salts are dissolved into a solvent. The aluminum is added to increase the solubility of RE ions in the silica matrix. This RE/alumina solution is soaked into the unconsolidated soot of a $SiO_2$ preform, thus "doping" it. After doping, the preform is drawn into fiber for use as a gain medium for amplifiers and lasers. In this conventional process there is no control over where the RE ions are deposited in the soot, and they tend to cluster, increasing the probability of ion-ion interactions and interactions with the $SiO_2$ host. These clustering effects only increase as the concentration of rare earth ions is increased in order to obtain a high energy laser.

These ion interactions can lead to up-conversion and concentration quenching. See W. J. Miniscalco, in "Optical and Electronic Properties of Rare Earth Ions in Glasses," *Rare Earth-Doped Fiber Lasers and Amplifiers*, 2nd edition, ch. 2, pp. 17-112, M. F. Digonnet, ed., Marcel Dekker Inc. 2001. Up-conversion and concentration quenching may be observed for all rare earth ions which have more complicated energy levels than Ytterbium, this includes $Er^{3+}$, $Ho^{3+}$, and $Tm^{3+}$. All such processes are detrimental because they decrease lasing efficiency. These effects worsen with the increased RE concentration needed for producing higher power, and in order to alleviate this RE ions must be kept separated. See A. Pastouret, et al., "Nanoparticle Doping Process for Improved Fibre Amplifiers and Lasers," *Proc. SPIE* 7195 71951X-1-8 (2009); D. Boivin, et al., "Performance Characterization of New Erbium-doped Fibers using MCVD Nanoparticle Doping Process," *Proc. SPIE* 7914, 791423-1-11 (2011); U.S. Publ. Appl. No. 2012/0148206; and U.S. Pat. No. 8,958,674.

A method called direct nanoparticle deposition (DND) has been used to create an optical fiber with very specific nanoparticles incorporated inside the core of the fiber. See Tammela, "Potential of Nanoparticle Technologies for Next Generation Erbium-Doped Fibers," *OFC*2004 *Technical Digest*, PBS (2004). The method used outside vapor deposition in which the glass having dopant precursors is heated by the flame of a specially-designed torch. The glass and the precursors react to form rare earth soots. The DND technique enables the rare earths to be dispersed uniformly at high concentrations. The chemical environment of the rare earths (i.e., the atoms immediately neighboring each rare earth) mainly determines the fluorescence properties of the rare earths that contribute to the main gain characteristics. The rare earths are inserted in the core matrix by using a spray pyrolysis technique. The environment of a rare earth thus depends on the composition of the core matrix. The DND technique distributes rare earths in a random fashion that does not enable the chemical environment around rare earths to be controlled. Thus, the DND technique does not make it possible to significantly improve the amplification efficiency of the optical fiber.

In other prior publications, the random nature of DND is pointed out and overcome by encaging erbium ions in $Al_2O_3$ nanoparticles or nanoparticles containing phosphorous. See A. Pastouret, et al., "Nanoparticle Doping Process for Improved Fibre Amplifiers and Lasers," Proc. *SPIE* 7195 71951X-1-8 (2009); D. Boivin, et al., "Performance Characterization of New Erbium-doped Fibers using MCVD Nanoparticle Doping Process," *Proc. SPIE* 7914, 791423-1-11 (2011); U.S. Publ. Appl. No. 2012/0148206; and U.S. Pat. No. 8,958,674. In this method, the Er ions were surrounded by a cage of Al and O, with the aim of reducing or eliminating the Er ion-ion excited state energy transfer that leads to upconversion and pair-induced quenching. Er-doped AlOOH Boehmite nanoparticles were first synthesized by the aqueous co-precipitation of Er and Al precursors. The particles were allowed to grow or "ripen" by maintaining the dispersion at 95° C. for one week, the silica soot preform was then doped by soaking with the NP dispersion. To remove the solvent and convert the Er-doped Boehmite to Er-doped alumina, the NPs in the core were calcined by heating the preform to ~1100° C. with a controlled temperature-time profile using the MCVD burner with helium flowing inside the tube. The resultant NPs were identified as $\alpha\text{-}Al_2O_3$ by x-ray diffraction. Further conversion to $\alpha\text{-}Al_2O_3$ occurred during the preform consolidation and collapse steps at temperatures up to 2000° C.

The emphasis of these prior publications was on erbium-doped fiber amplifiers for telecom applications, and the typical doping levels were in the ~4 to ~10 dB/m range of peak Er absorption at 1530 nm with one fiber having 23.4 dB/m absorption. Another aspect of these publications was to reduce pair-induced quenching, where the nanoparticles were separated enough to overcome this method of quenching.

In a prior publication an increase of the stimulated Brillouin scattering (SBS) threshold was obtained by reduction of the overlap of guided optical and acoustic waves. See M.-Jun Li, et al., "Al/Ge co-doped large mode area fiber with high SBS threshold," *Optics Express* 15:8290-8299 (2007). The acoustic index of a material may be defined in a way analogous to the optical index, where the velocity of sound is compared to the velocity of sound in $SiO_2$. The reduced overlap between the optical and acoustic modes was carried out by using conventional solution doping, and the use of nanoparticles was neither investigated nor discussed.

See U.S. Pat. No. 8,655,129. Similarly, in prior publications a SBS threshold increase was obtained by incorporation of materials of lower photoelastic coefficients than $SiO_2$, but nanoparticle doping was not used. See P. D. Dragic, et al., "Compositional tuning of glass for the suppression of non-linear and parasitic fiber laser phenomena," *Proc. of SPIE* Vol. 9081 908109-2 (2014); P. D. Dragic, et al., "The Brillouin gain coefficient of Yb-doped aluminosilicate glass optical fibers," *Optical Materials* 35:1627-1632 (2013).

In general, existing technologies (such as solution doping techniques) have failed to address phonon quenching as a result of rare earth interactions with the $SiO_2$ lattice. The invention beneficially provides methods and apparatus for suppressing stimulated Brillouin scattering (SBS), multiphonon quenching, and clustering.

SUMMARY OF THE INVENTION

The invention described herein, including the various aspects and/or embodiments thereof, meets the unmet needs of the art, as well as others, by providing methods for synthesizing fibers having nanoparticles therein, and preforms and fibers incorporating nanoparticles. The nanoparticles may include one or more rare earth ions selected based on fluorescence at eye-safer wavelengths, surrounded by a low-phonon energy host. Nanoparticles that are not doped may also be included as a co-dopant to help increase solubility of nanoparticles doped with rare earth ions in the silica matrix. The nanoparticles may be incorporated into a preform, which is then drawn to form fiber. The fibers may beneficially be incorporated into lasers and amplifiers that are eye safer than lasers and amplifiers that do not include fibers incorporating the nanoparticles. Lasers and amplifiers incorporating the fibers may also beneficially exhibit reduced Stimulated Brillouin Scattering.

In one aspect of the invention, a silica preform includes silica; rare-earth doped nanoparticles including a host material having a lower phonon energy than the silica, and one or more rare-earth ions; and optionally one or more co-dopant nanoparticles, wherein the co-dopant nanoparticles increase dispersion of the rare-earth doped nanoparticles in the silica.

According to another aspect of the invention, fiber gain media is provided which includes a silica cladding and a silica core including nanoparticles comprising a material having a lower phonon energy than the silica, and rare-earth ions. The fiber gain media may emit wavelengths longer than approximately 1.4 μm.

According to yet another aspect of the invention, a method for doping a silica preform includes forming a silica soot in a substrate doping tube comprising a cladding layer; soaking the silica soot in a dispersion containing nanoparticles in a liquid dispersant; drying the silica soot to remove liquid dispersant; and consolidating the silica soot and nanoparticles. In some aspects, the nanoparticles may comprise rare earth ions, and/or the silica soot may be soaked with a solution of rare earth ions prior to consolidating. Fiber gain media may be drawn from the silica preform to provide an eye-safer fiber gain media that emits wavelengths longer than approximately 1.4 μm.

According to still another aspect of the invention, an eye-safer gain media includes silica; rare-earth doped nanoparticles comprising a host material having a lower phonon energy than the silica, and one or more rare-earth ions; and optionally one or more co-dopant nanoparticles increasing solubility of the rare-earth doped nanoparticles in the silica, wherein the eye-safer laser operates at wavelengths longer than approximately 1.4 μm.

According to yet another aspect of the invention, a method for reducing stimulated Brillouin scattering (SBS) in gain media includes forming an outer core in the gain media comprising second nanoparticles, providing the outer core with a first acoustic refractive index and a first optical refractive index; forming an inner core in the gain media comprising first nanoparticles, providing the inner core with a second acoustic refractive index and a second optical refractive index; wherein the first and second acoustic refractive indices and first and second optical refractive indices result in reduced overlap of optical and acoustic modes within the gain media. In some aspects, the method reduces the Brillouin gain coefficient by a factor of 3.6 as compared to similar gain media not including the nanoparticles. In other aspects, the method reduces the Brillouin gain coefficient by a factor of 10 as compared to similar gain media not including the nanoparticles. In further aspects, the method reduces the Brillouin gain coefficient to zero.

According to an additional aspect of the invention, a method for reducing stimulated Brillouin scattering (SBS) in gain media includes providing a silica preform comprising a core and a cladding; doping the core of the silica preform with nanoparticles comprising rare-earth ions; doping the core of the silica preform with undoped nanoparticles; and drawing a fiber from the preform. The fiber forms a gain media exhibiting reduced SBS compared to gain media that does not have a core comprising rare-earth nanoparticles and undoped nanoparticles. In some aspects, the method achieves a reduction in the SBS gain coefficient that is 3.6 times greater than the reduction achieved using conventional methods. In other aspects, the method achieves a reduction in the SBS gain coefficient that is 10 times greater than the reduction achieved using conventional methods.

According to still another aspect of the invention, a method for reducing stimulated Brillouin scattering (SBS) in gain media includes providing a silica preform comprising a core and a cladding; doping the core of the silica preform with nanoparticles; and drawing a fiber from the preform. The fiber forms a gain media that exhibits a reduced Brillouin gain coefficient as compared to a gain media that does not have a core doped with the nanoparticles.

According to another additional aspect of the invention, an eye-safer gain media includes a core and a cladding, where the core is doped with nanoparticles in concentrations that reduce the Brillouin gain coefficient of the gain media. In some aspects, the concentration of nanoparticles is increased until the Brillouin gain coefficient of the gain media is reduced by 3.6 times, preferably is reduced by 10 times, and more preferably the Brillouin gain coefficient of the gain media is reduced to zero. In some aspects, the nanoparticles may be selected based on properties selected from the group consisting of an acoustic velocity greater than silica, a Brillouin spectral width greater than silica, a refractive index approximately the same as silica, a negative Pockels' coefficient, and combinations thereof. In some aspects, the nanoparticles may be selected from $Al_2O_3$, $LaF_3$, $Lu_2O_3$, $Ga_2O_3$, $In_2O_3$, $Bi_2O_3$, and $P_2O_5$. In some aspects, the nanoparticles may optionally include one or more rare-earth ions, including eye-safer rare earth ions, as well as rare-earth ions (such as $Yb^{3+}$) that are not eye safer.

In a further aspect of the invention, an amplifier is provided that includes a pump source, a signal source, and gain media having a silica cladding and at least one silica core provided within the silica cladding. The core includes nanoparticles formed from a material having a lower phonon energy than the silica. The pump absorption efficiency of the gain media is increased as compared to gain media not doped with the nanoparticles.

Other features and advantages of the present invention will become apparent to those skilled in the art upon examination of the following or upon learning by practice of the invention.

BRIEF DESCRIPTION OF THE DRAWINGS

FIGS. 2A-2B are photographs comparing doped $SiO_2$ fiber preforms formed with and without co-dopant nanoparticles. In FIG. 2A, an $SiO_2$ fiber preform having $Er:LaF_3$ nanoparticles doped into the core shows devitrification (see line in core). In FIG. 2B, an $SiO_2$ fiber preform having $Er:LaF_3$ nanoparticles and $Al_2O_3$ nanoparticles added as a co-dopant exhibits no evidence of devitrification.

DETAILED DESCRIPTION OF EMBODIMENTS OF THE INVENTION

Figure 1A:
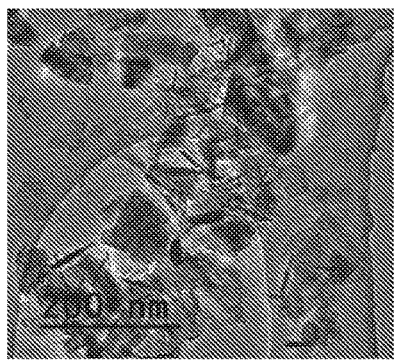
FIGS. 1A-1C are TEM images showing the structures of various types of $Er^{3+}$ nanoparticles formed under varying ripening conditions.

The invention described herein, including the various aspects and/or embodiments thereof, meets the unmet needs of the art, as well as others, by providing methods for synthesizing fibers having nanoparticles therein, and preforms and fibers incorporating nanoparticles. The nanoparticles may include one or more rare earth ions selected based on fluorescence at eye-safer wavelengths, surrounded by a low-phonon energy host. Nanoparticles that are not doped with rare earth ions may also be included as a co-dopant to help increase solubility of nanoparticles doped with rare earth ions in the silica matrix. The nanoparticles may be incorporated into a preform, which is then drawn to form fiber. The fibers may beneficially be incorporated into lasers and amplifiers that operate at eye safer wavelengths. Lasers and amplifiers incorporating the fibers may also beneficially exhibit reduced Stimulated Brillouin Scattering (SBS).

This invention overcomes previously-unaddressed challenges associated with fiber technology, particularly silica fiber. The invention provides the ability to achieve scaling to kW power and high efficiency, especially for rare earth ions that operate in the eye-safer regions of the electromagnetic spectrum. This is currently not possible and is critically needed, especially within the defense community.

High-energy lasers (HELs) offer a highly effective and affordable defense capability, and are being developed for applications that include directed energy systems and wireless power transmission. Currently, however, there are limitations on the power achievable using conventional techniques. The invention provides nanoparticle doping for high power fiber lasers, which may beneficially permit them to operate at eye-safer wavelengths. Erbium, holmium, and thulium doped fiber lasers are particularly attractive candidates for high energy lasers (HELs) for directed energy weapons applications because they operate in a wavelength region that is both eye-safer and within the window of high atmospheric transmission.

Diffuse and low intensity parasitic reflections from atmospheric aerosols, dust particles, or the target itself are focused onto the retina with a gain of >10 4 for wavelengths <1.4 µm. E. J. Friebele, et al., "Nanoparticle Doping for Improved Power Scaling of Resonantly-Pumped, Yb-Free Er-Doped Fiber Lasers," *SPIE Defense, Security and Sensing Conference*, Paper 9081-7 (2014); C. C. Baker, et al., "Nanoparticle doping for high power fiber lasers at eye-safer wavelengths," Optics Express 25(12):13903-15 (2017). Though technically not eye safe due to the high powers generated, for practical applications, HELs and other lasers having wavelengths >1.4 µm achieve some degree of laser safety and avoid retinal eye damage since the cornea, lens, vitreous, and aqueous humor absorb the light and reduce the chances of potential damage to the retina caused by the diffuse laser beam scatter. HEL systems must also operate in the wavelength region where there is low atmospheric absorption due to water molecules. These high atmospheric transmission windows occur between about 1.5 µm and 1.75 µm, and at wavelengths longer than about 2.1 µm. Rare earth ions that are of particular interest for use in high-energy lasers operating at eye safer wavelengths include $Er^{3+}$, $Ho^{3+}$ and $Tm^{3+}$.

Nanoparticles.

Nanoparticles in accordance with the invention include particles that do not incorporate a rare-earth ion dopant, as well as particles in which rare-earth ions are incorporated into nanoparticle hosts. The rare-earth doped nanoparticles of the invention may be incorporated into a silica fiber matrix. An undoped nanoparticle of the invention may be similarly incorporated into a silica matrix, but without the presence of the rare earth ion therein.

The nanoparticles of the invention may be formed from compounds that include, but are not limited to, $Al_2O_3$, $LaF_3$, $Lu_2O_3$, $Ga_2O_3$, $In_2O_3$, $Bi_2O_3$, and $P_2O_5$. The nanoparticles, whether doped or undoped, may be selected from a single compound. In other aspects, a blend of two different nanoparticle compounds may be used in a single preform. In additional aspects, blends of more than two different nanoparticle compounds may be used in a single preform. When more than one nanoparticle compound is used, the specific selected nanoparticles may be mixed together and loaded in the preform, or loaded sequentially to form a desired pattern within the preform. This also allows the gain spectrum of an amplifier to be tailored, along with spatial tailoring of other optical properties, while simultaneously reducing SBS. This is particularly important for telecommunications-related applications. For example, multicore fibers may be provided that have similar nanoparticles or different nanoparticles within the different cores. Additional benefits that may be realized by using the nanoparticles of the invention in fiber gain media include, but are not limited to, broadening the fiber amplifier gain spectrum, tailoring the fiber gain spectrum to avoid spectrum equalization, equalizing the gain for different spatial modes, and increasing pump absorption efficiency.

The invention encompasses nanoparticles of any size that is capable of being loaded into pores in a core soot of a fiber preform to be doped. The nanoparticles are preferably not larger than 100 nm, and preferably range in size from about 5 nm to about 100 nm. Practically, there is no lower limit on the size of the nanoparticles.

The nanoparticles for incorporation into preforms and fibers may be undoped or doped with rare earth ions.

When undoped, the nanoparticles may be used in order to achieve particular characteristics in the finished preform or fiber, particularly in the core. Undoped nanoparticles may be concentrated in the center of the preform or fiber to increase the refractive index of the fiber core. One or more layers of undoped nanoparticles having different compositions (and different refractive and acoustic indices) may also be provided in the preforms and fibers in order to tailor optical and acoustic fields of the fiber, for example, to reduce SBS.

When doped, the nanoparticles preferably have a lower phonon energy than the fiber used as the gain medium in order to form a low phonon energy "cage" around one or more rare-earth ions that reduces likelihood of multi-phonon quenching, which is believed to be caused by the interaction of the high energy phonons from the host (for example, $SiO_2$ has a phonon energy of 1100 $cm^{-1}$). According to this embodiment, in addition to providing a low phonon energy, the host nanoparticle also maintains a separation of greater than about 2 nm between the rare-earth ions contained therein. There is no maximum separation.

Rare-earth (RE) ions that may optionally be incorporated into the doped nanoparticles, preforms, and fibers of the invention include, but are not limited to, erbium ($Er^{3+}$), thulium ($Tm^{3+}$), holmium ($Ho^{3+}$), ytterbium ($Yb^{3+}$), praseodymium ($Pr^{3+}$), neodymium ($Nd^{3+}$), dysprosium ($Dy^{3+}$), or any 3+ rare-earth ion from the Lanthanide series of the periodic table. Preferably, the rare-earth ions emit in the eye-safer region of the electromagnetic spectrum. Particularly preferred RE ions include $Er^{3+}$, $Tm^{3+}$, and $Ho^{3+}$.

In some aspects of the invention, particularly when rare-earth doped nanoparticles are provided, co-dopant nanoparticles (i.e., undoped or passive nanoparticles) may also be incorporated into a preform or fiber. These co-dopant nanoparticles include, but are not limited to, $Al_2O_3$, $Bi_2O_3$, $P_2O_5$, $Ga_2O_3$, and $In_2O_3$. The co-dopant nanoparticles of the invention preferably range in size from about 1 to about 100 nm, and are preferably less than 50 nm in size, and more preferably less than 20 nm in size. The co-dopant nanoparticles may be selected to aid in the dispersion of other species within the preform or fiber, or they may be added in order to tailor the refractive index profile of the drawn fiber. The co-dopant nanoparticles may beneficially provide for an increased refractive index in the core, without causing the nanoparticles to be broken down or dissolved, as can occur if the nanoparticles are subjected to solutions of alumina.

The rare earth doped nanoparticles may be synthesized by a number of techniques, and are not to be considered limited to any particular method of production. Common methods include co-precipitation using a salt of the rare-earth ion, where the rare-earth ion precipitates out of solution along with a host nanoparticle. The host nanoparticle may be selected based on properties such as: (1) a phonon energy lower than the value for pure silica (which is 1100 $cm^{-1}$), and preferably less than 800 $cm^{-1}$; (2) an acoustic velocity larger than the value for pure silica (which is 5970 m/s); (3) a Brillouin spectral width greater than 40 MHz (which is the value for single-mode optical fiber (SW) used as telecommunications fiber); a photoelastic, or Pockels, constant that is lower than that of silica, and is preferably negative, such that when the nanoparticle dopant is combined with silica the resultant Pockels' coefficient for the fiber approaches zero (by additive modeling) depending on the dopant; (4) a rare earth ion solubility higher than that for the same rare earth ions in pure silica (~100 ppm is the approximate solubility limit for rare earth ions in pure silica), preferably the solubility is greater than 100 ppm, more preferably the solubility is greater than 1000 ppm, and still more preferably the solubility is greater than 10,000 ppm; and combinations of any or all of these properties. The precipitation occurs such that a small amount of the rare earth ions are encaged inside the selected nanoparticle host. Precipitation may also be used to prepare undoped nanoparticles, where the nanoparticle material precipitates out of a solution that does not include a source of rare earth ions. Those skilled in the art will appreciate that a variety of methods are also available for forming undoped nanoparticles.

The nanoparticles of the invention (whether doped or undoped) may be synthesized in the presence of an organic ligand that forms a capping layer to prevent agglomeration, or a capping layer of organic ligand may be applied after formation of the nanoparticles. Preferred organic ligands may include polyvinyl pyrrolidone of any molecular weight, and citric acid. One presently-preferred organic ligand is polyvinyl pyrrolidone having a molecular weight of about 10,000 g/mol, known as PVP 10K.

Stable dispersions of the doped or undoped nanoparticles may be obtained in a liquid medium, such as an alcohol or an aqueous solution. Preferred liquids include the alcohols methanol and ethanol. Dispersions of doped and undoped nanoparticles may optionally be mixed in any desired ratio to provide a dispersion containing doped and undoped nanoparticles.

The combination of a capping layer and alcohol or aqueous solution forms a stable dispersion that may then be filtered, for example, using nylon filter media having a pore size of 0.6 μm or greater. Filtering ensures that nanoparticle clusters do not grow to a large size. Large clusters are not desirable in the fiber, as they represent scattering sites. The clusters are therefore preferably less than 600 nm in size, but are preferably less than 100 nm.

Figure 1B:
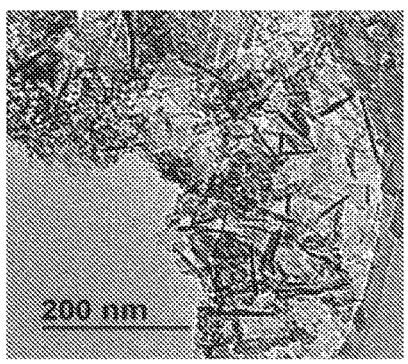
Figure 1C:
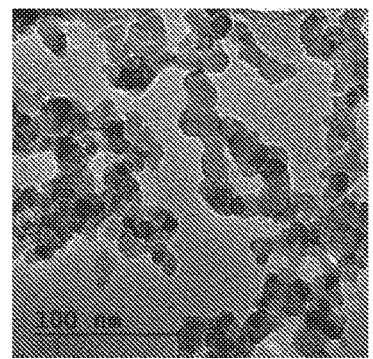

FIG. 1 provides a comparison of the impact of different precipitation conditions on the structures of the rare-earth doped nanoparticle precipitates. The temperature and duration of time for ripening affect the nanoparticle size and morphology. Ripening may be carried out over a period of several hours to several days, and at temperatures ranging from about 90° C. to about 200° C. Ripening for 1 week at 95° C. resulted in the nanoparticles shown in FIG. 1A. Ripening for 1 week at 160° C. resulted in the nanoparticles shown in FIG. 1B. A preferred nanoparticle ripening occurs at a temperature of 160° C., maintained for 17 hours, and the resulting nanoparticles are shown in FIG. 1C.

Preforms and Fibers.

The invention provides nanoparticle-doped preforms, methods for doping preforms with nanoparticles, and optical fibers drawn from nanoparticle-doped preforms. Conventional solution doping with rare earth ions, such as erbium and holmium, fails to achieve the benefits realized by the nanoparticle-doped preforms and fibers of the invention.

In preferred aspects, the material used to form the preforms and fibers is silica ($SiO_2$) based. Silica based preforms and fibers include, but are not limited to, silica, and silica containing one or more index-modifying dopants. These index-modifying dopants may be included in the silica preform and resulting fiber in order to form a waveguide including a core and one or more cladding layers, where the core has a higher index of refraction than the surrounding cladding. Those skilled in the art are able to determine specific indices of refraction to be selected for the core and cladding based on the application for which the fiber is intended. Index-raising dopants include, but are not limited to, germania ($GeO_2$), phosphorus pentoxide ($P_2O_5$), and alumina ($Al_2O_3$). Index-lowering dopants include, but are not limited to, fluorine and boron oxide ($B_2O_3$). The transition from core to cladding may be sharp or gradual, using either a step-index profile or a graded-index profile, respectively. After drawing the fiber from the preform, the finished fiber may optionally be coated with a buffer layer and/or a protective layer. The buffer layer is preferably a coating of plastic that protects the fiber. The protective layer is preferably formed of a polymer, such as polyvinyl chloride, polyethylene, polyurethane, polybutylene terephthalate, polyamide, or others, as well as optional fibers or wires included to provide strength to the fiber. The fibers may optionally be double clad or triple clad, such as those used in fiber laser/amplifier applications.

The optical fibers may be single-mode fibers or multi-mode fibers, depending on the desired application for the fiber. The core diameter of a single-mode fiber is typically smaller than the core diameter of a multi-mode fiber. A single-mode fiber, for example, may have a core diameter of from about 8 μm to about 10 μm, with a typical core diameter of about 9 μm. A multi-mode fiber, for example, may have a core diameter of from about 50 μm to about 100 μm, with typical core diameters including 50 μm and 62.5 μm. The diameter of the cladding for both single-mode and multi-mode fibers may vary from about 100 μm to about 500 μm, with typical cladding diameters including 125 μm and 240 μm. A single mode fiber may be selected for power transfer or directed energy applications, for scientific research, as well as for communications applications. A multimode fiber having a broad gain may be selected for communications applications. Also, a single fiber consisting of multiple cores (called a multicore fiber) may be used. When multiple cores are provided, they may all be doped in the same pattern using the same nanoparticles, or one or all of the fibers may be doped using different nanoparticles and/or in different patterns.

The preforms and fibers of the invention may incorporate doped or undoped nanoparticles (where the nanoparticles may have a single composition, or a blend of nanoparticle compositions may be provided), a combination of doped and undoped nanoparticles, a combination of doped nanoparticles and solution doping of the preform material, a combination of undoped nanoparticles and solution doping of the preform material, or a combination of doped and undoped nanoparticles and solution doping of the preform material, according to the particular characteristics desired in the fiber.

Figure 3:
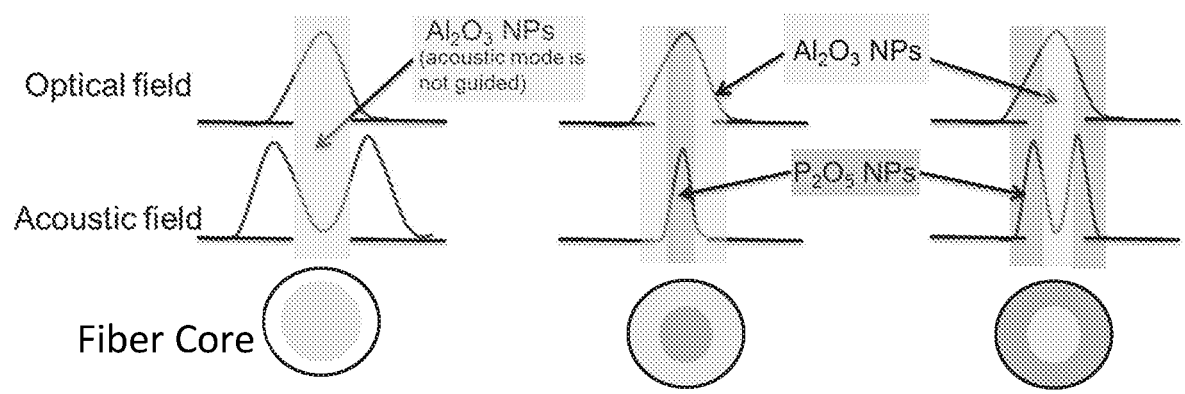
FIG. 3 is a diagram illustrating the use of multiple core layer depositions with nanoparticle dopants to reduce overlap of the acoustic and optical modes.

Undoped nanoparticles may be incorporated into the preforms and fibers. The undoped nanoparticles may have a smaller phonon energy than the fiber material. Combinations of undoped nanoparticles may be included in separate layers within the core in order to provide tailored optical and acoustic fields within the core of the fiber. For example, concentric layers of $Al_2O_3$ and $P_2O_5$ may be provided in a fiber core to guide the acoustic and optical fields, as shown in FIG. 3. Here the overlap of the acoustic field is funneled away from the optical field.

In some aspects, the nanoparticles incorporated into the preforms and fibers include rare earth ions encapsulated within a nanoparticle host, preferably a host having a smaller phonon energy than the fiber material. The encapsulation of the rare-earth ions in the nanoparticle host beneficially permits the rare earth ions to be separated from one another inside the host, preferably by at least 2 nm, and isolated from the influence of the fiber lattice.

Accordingly, preforms and fibers are provided that may incorporate rare-earth doped nanoparticles, and may incorporate undoped nanoparticles. When provided, the rare-earth doped nanoparticles may beneficially result in a laser that emits eye-safer wavelengths of electromagnetic radiation. When provided, the undoped nanoparticles may beneficially provide a higher refractive index in the fiber core than in the cladding, improve dispersion of the rare-earth doped nanoparticles in the fiber matrix, and/or reduce SBS. Additional ions may also be incorporated into the preforms and fibers by solution doping.

By way of example only, the nanoparticles of the invention may be incorporated into laser fiber in order to achieve desired concentrations of rare earth ions. For example, where the rare-earth ion is erbium, concentrations ranging from 40 dB/m to 100 dB/m may be provided in the fiber, preferably from 40 dB/m to 60 dB/m. Those skilled in the art will appreciate that the concentration of rare-earth ion included in the fiber will vary depending on the specific application and the particular rare-earth ion selected.

The invention is also directed to a process for obtaining a rare-earth nanoparticle doped fiber. These fibers may be used, for example, as the gain medium in a high power laser operating in the eye-safer region of the electromagnetic spectrum.

A preform may be doped with nanoparticles that have a rare-earth ion encaged within a low-phonon-energy host, or a host chosen to reduce clustering or to increase the threshold for stimulated Brillouin scattering (SBS). Additional nanoparticles that do not include rare-earth ions may also be added as a co-dopant in order to aid in the solubility of otherwise insoluble species in the $SiO_2$ fiber, or they may be added in order to tailor the refractive index profile of the fiber.

Various synthesis procedures are encompassed by the invention, as well as examples of nanoparticle doped preforms, and fibers having properties that are enhanced by the doping methods. In some aspects, the preforms of the invention are fabricated so as to have an increased concentration of rare-earth doped nanoparticles in the center of the core, with gradually decreasing concentrations of the rare-earth doped nanoparticles at the edges. A second doped or undoped nanoparticle may also be provided in the material around the periphery of the preform core in order to tailor its optical characteristics. In other aspects, the preforms of the invention have an increased concentration of a first undoped nanoparticle in the center of the core, and the preform core is solution doped with a rare-earth ion. In additional aspects, the preforms of the invention may be formed so as to have an increased concentration of a first undoped nanoparticle in the center of the core, and an increased concentration of a second undoped nanoparticle at the outer edges of the core, in what is known as a Gaussian profile.

Doped preforms may be formed by modifying conventional fiber preform fabrication methods to impregnate the nanoparticles of the invention into the preform at desired locations, i.e., in the center of the core or around the circumference of the core. Fibers may be formed by drawing the finished doped preforms, and optionally coating the fibers with one or more polymers to provide mechanical and chemical protection and to provide a low refractive index coating that serves as a pump cladding.

In some aspects, a solution of nanoparticles (doped or undoped) may be incorporated into the preform core in an in situ process on a lathe, where the nanoparticles are impregnated into the core soot of the preform through a pump. The rare-earth doped nanoparticles may be incorporated in the silica soot at volume fractions of from 0.01 to as high as 50%, with ideal volume fractions from 0.5 to 5%. The undoped nanoparticles may be incorporated in the silica soot at volume fractions of from 0.01 to as high as 50%, with ideal volume fractions from 0.5 to 5%. The nanoparticles may be dried and further processed in situ in the preform on the lathe without removal of the substrate doping tube. The preform is subsequently consolidated and collapsed without having been cut from the lathe.

A preform in accordance with the invention may be prepared that functions as a waveguide, and includes a cladding and a core. The cladding has a slightly lower refractive index than the core, preferably at least about 1% lower, more preferably at least about 5% lower. This allows any light inside the core to be guided throughout the core with very low absorption. One example of a method that may be used to create a fiber waveguide using silica is described below. Those skilled in the art will appreciate that additional methods may be used to prepare the preforms used to draw the fibers of the invention.

A hollow, high purity, commercially-available silica substrate tube is joined to an inlet tube and an outlet tube on a modified chemical vapor deposition (MCVD) lathe. High purity vapors such as $SiCl_4$ and $O_2$ gas and other possible reactants are then flowed through the inlet tube, into the substrate tube where a reaction occurs because there is a torch passing along its outside walls. The substrate tube is maintained at a high temperature of from 1600° C. to 1800° C., preferably about 1700° C. At this temperature the $SiCl_4$ and $O_2$ react on the inside walls of the substrate tube to form $SiO_2$. But because this is such a high temperature, this $SiO_2$ is automatically consolidated into clear glass as the reaction occurs. This forms the cladding layer(s) for the silica waveguide.

Next the core layer(s) are formed. $SiCl_4$ and $O_2$ and other possible reactant vapors (such as $GeCl_4$ (germanium chloride)) may be flowed into the substrate tube, but this time at a lower temperature of from 1300° C. to 1400° C., preferably about 1330° C. In this case, the $SiCl_4$ and O2 react as before, and the GeCl also reacts. This soot is now germanium doped $SiO_2$. The germanium gives this soot a higher refractive index than the cladding layers, thereby forming the core of the waveguide. The temperature in this case is too low for the core soot to be consolidated into a clear glass, as was the case for the cladding layers. This core soot is "puffy" and porous and sticks to the inside walls of the tube on top of the cladding layers. This core soot is ready to be "doped" with either a solution containing rare earth ions (conventional processing), or with a nanoparticle dispersion in methanol or other liquids. The porous nature of the core soot allows the solution of rare earth ions or nanoparticle dispersion to soak into it.

In preferred aspects of the invention, the core is not doped with germanium, but instead $SiCl_4$ and $O_2$ are be flowed into the substrate tube, at a temperature of from 1300° C. to 1400° C., preferably about 1330° C. The $SiCl_4$ and $O_2$ react to form a soot of $SiO_2$ that is ready for doping with a dispersion of nanoparticles, as described above.

In some aspects, the silica substrate tube with the consolidated cladding layers and the unconsolidated soot may be cut off of the MCVD lathe and a solution of rare earth ions may be pumped into it, in order to cause the rare earth ions to soak into the core soot. The nanoparticle dispersions of the invention may also be pumped into the tube using this technique. For example, $Al_2O_3$ nanoparticles provide the increase in refractive index needed to form a core of a waveguide. The $Al_2O_3$ nanoparticles provide additional benefits, such as solubilizing rare earth ions, separating rare earth ions, and increasing the concentration of rare earth ions in the center of the core.

According to a preferred embodiment of the invention, the silica substrate tube with consolidated cladding layers and unconsolidated soot may be left intact on the lathe. One end of the lathe may then be elevated, for example, using a jack. The rare earth ion solution or nanoparticle dispersion may then be pumped into the tube from the lower end, without having the dispersion flow out of the tube. The tube is filled and allowed to stand so that the dispersion soaks into the unconsolidated soot to "dope" it. After the tube with the cladding layers and the unconsolidated core layers have been soaked with the dispersion (or solution) and dried, the core is then consolidated at high temperature, i.e., at a temperature of from 1600° C. to 1800° C., preferably about 1700° C.

It is also possible to use this method to create two or more core layers, where each core layer may have different nanoparticle and rare earth species. This may be accomplished by applying a second core soot layer after consolidating the first doped core soot layer. The second core soot layer is then doped on the lathe by pumping a solution of rare earth ions or dispersion of nanoparticles into the unconsolidated second core layer. This unconsolidated second core layer is then dried and consolidated at high temperature, i.e., at a temperature of from 1600° C. to 1800° C., preferably about 1700° C. This process may be repeated as many times as necessary to create a desired core profile.

After all core layers have been applied, doped, and consolidated, the tube is then collapsed into a solid preform at about 2000° C. The solid preform may then be drawn into fiber using conventional fiber drawing techniques and apparatus. The fibers of the invention drawn from the preforms of the invention may beneficially be used as gain media for lasers and amplifiers.

Among the rare earth ions that are attractive candidates for high energy lasers, $Ho^{3+}$ and $Tm^{3+}$ provide an operational wavelength at ~2 μm, which is both in the eye safe region, and the low atmospheric absorption window. These ions, however, are inherently less efficient in radiative processes because they are four level systems, where the emission terminates at a level above the ground state. Furthermore, when these ions are doped into silica glass, non-radiative processes can dominate the decay from the upper to lower level. The fluorescence lifetime is composed of both radiative and non-radiative processes. In a host with a large phonon energy, the non-radiative process can dominate, and the radiative lifetime is significantly reduced. The phonon energy for silica has a large value of 1100 cm$^{-1}$, therefore this presents problems for using these ions in silica fibers. The coupling results in electronic states which are bridged by one or a few phonons. This is a process that competes with the desired radiative relaxation of rare-earth ions. The relaxation of ions through phonon quenching is non-radiative and occurs at much quicker timescales. Because phonon quenching reduces fluorescence lifetimes for rare-earth dopants, lasing efficiency is decreased. These non-radiative transitions may occur at even larger energies than the host phonon energy when phonons combine, giving multi-phonon transitions. The probability for multi-phonon transitions quickly decreases with the number of phonons bridging the energy gap (see M. J. Weber, Probabilities for radiative and non-radiative decay of $Er^{3+}$ in $LaF_3$, Physical Review, 157, no 3 pp 262-272 (1967)), therefore rare-earth ions incorporated into hosts with smaller phonon energy than the host fiber (i.e., $SiO_2$) are desirable.

The preforms and formed by the methods of the invention exhibit improved fluorescence lifetimes as compared to preforms formed by conventional solution-doping methods. A comparison of fluorescence lifetimes for preforms that are solution doped versus nanoparticle doped is also provided in FIG. 4.

Inclusion of co-dopant (undoped) nanoparticles in the preform may beneficially increase the solubility of rare-earth doped nanoparticles in the preform. As shown in FIG. 2A, a preform containing $Er:LaF_3$ nanoparticles, but not including any co-dopant nanoparticles, exhibits devitrification. A preform containing $Er:LaF_3$ nanoparticles that also includes co-dopant $Al_2O_3$ nanoparticles exhibits no devitrification (see FIG. 2B), and a uniform dispersion of rare-earth doped nanoparticles in the $SiO_2$ lattice of the preform.

Figure 5:
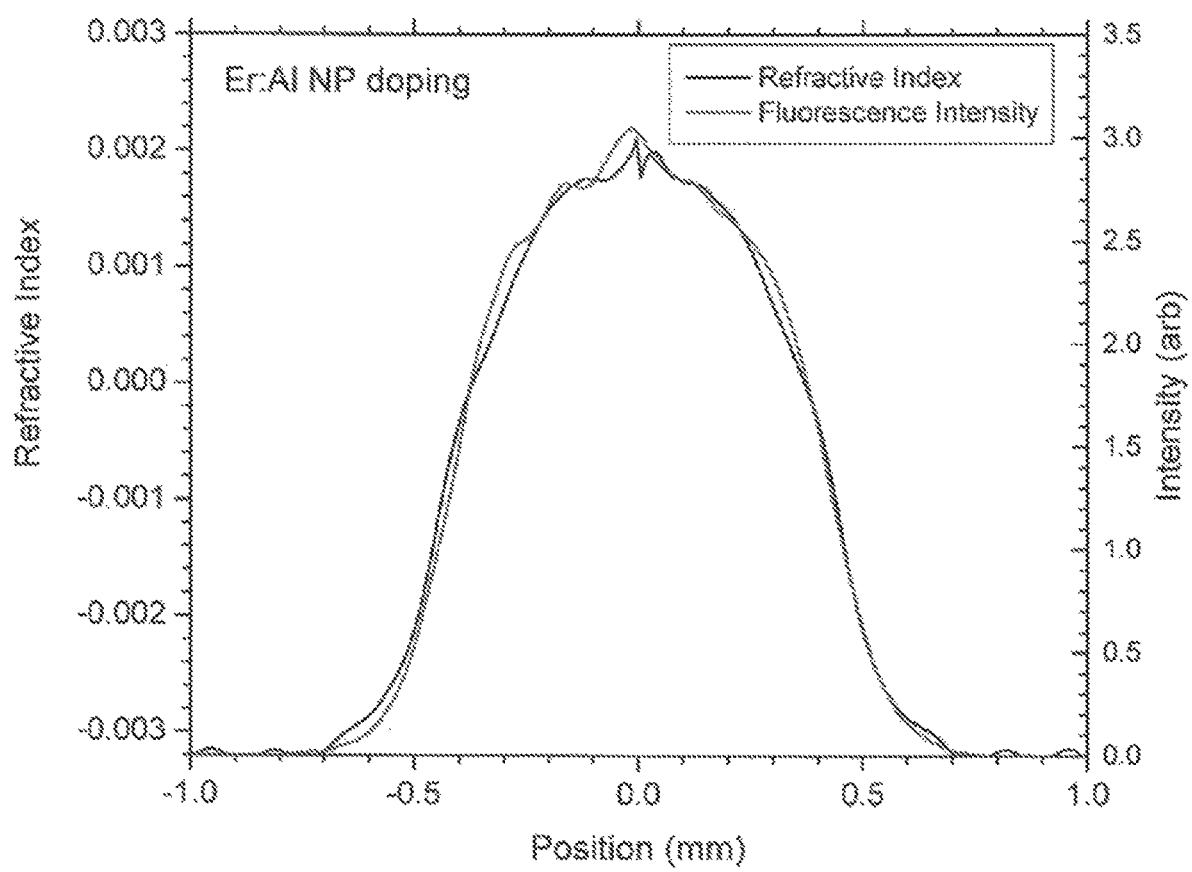
FIG. 5 is a graph showing the refractive index and fluorescence intensity for a preform doped with Er:Al nanoparticles, exhibiting the greatest concentration of the rare-earth dopant in the center of the fiber core.

The addition of $Al_2O_3$ or other undoped nanoparticles may also be used to tailor the core refractive index to the desired value. This may be used as an alternative to doping with germanium in the preform soot, which can lead to "burn out" in the core, thus giving a large "dip" in the fiber refractive index profile. This dip in the refractive index profile also corresponds to a reduced level of rare earth dopants. This phenomena is well-known to those skilled in the art. The rare earth dopant should ideally be at its greatest concentration where the mode field is at its most intense, in the center of the fiber core, and decrease toward the periphery or outside edge of the fiber core. This is also shown in FIG. 5, which graphs the refractive index and intensity in a rare-earth nanoparticle doped fiber, showing that the refractive index and fluorescence intensity are highest in the center of the fiber core.

Lasers and Amplifiers.

Lasers in accordance with the invention may be formed by incorporating the inventive fibers (also known as gain fibers) into conventional laser components known to those skilled in the art. In addition to the gain media, these include, but are not limited to, a pump source, a signal source, and filter elements to form an optical cavity that separates the pump from the signal (where the filter elements may include mirrors or fiber Bragg gratings to select the signal). Conventional laser fiber gain media may be replaced by the inventive gain media in order to attain lasers that operate at eye-safer wavelengths and/or exhibit reduced levels of SBS.

Amplifiers in accordance with the invention may be formed by incorporating the inventive fibers (also known as gain fibers) into conventional amplifier components known to those skilled in the art. In addition to the gain media, these include, but are not limited to, a pump source and a signal source. Conventional fiber gain media may be replaced by the inventive gain media for amplifier fibers containing rare-earth doped and/or undoped nanoparticles in order to attain amplifiers that operate at eye-safer wavelengths and/or exhibit reduced levels of SBS.

The "eye-safer" region for lasers and amplifiers includes wavelengths longer than approximately 1.4 μm, where retinal eye damage is avoided because the light is strongly absorbed in the cornea and lens, and does not reach the retina. However, those skilled in the art will appreciate that even if a laser or amplifier is "eye-safer" due to reduced possibility of retinal damage, it is still necessary to utilize eye protection to practice good industrial hygiene and avoid the possibility of injury to the eye. For example, at longer wavelengths, such as around 3 μm and 10 μm, optical pulses can be absorbed in the cornea. Even though such wavelengths are "retina-safe," corneal damage can occur. The determination of whether a particular laser or amplifier apparatus is "eye safe" depends on the emission wavelength, power level, optical intensity, and beam divergence of the laser. In accordance with some aspects of the invention, the eye-safer wavelengths are from about 1.4 μm to about 2.1 μm, preferably from about 1.5 μm to about 1.6 μm, and near about 2.0 μm. These eye-safer wavelengths may be achieved by doping the fiber with the rare-earth nanoparticles of the invention, or by solution doping the fiber with rare-earth ions and also incorporating the rare-earth doped and/or undoped nanoparticles of the invention.

Nanoparticle doping is used in a $SiO_2$ fiber to produce a high power laser (i.e., a kW-class laser) operating at eye safer wavelengths, for example, in the region near 2 μm. The fiber may contain nanoparticle hosts with rare earth ions, for example, Holmium ($Ho^{3+}$), or Thulium ($Tm^{3+}$), incorporated inside them. The nanoparticle hosts may be composed of $LaF_3$, for example, to form $Ho:LaF_3$, or $Tm:LaF_3$, or other trivalent fluoride nanoparticles, $Lu_2O_3$, $Al_2O_3$, and other species that have phonon energies lower than that of $SiO_2$, such as $Ga_2O_3$, $In_2O_3$. Mixtures of these nanoparticle hosts may also be used, for example, to achieve a large bandwidth for gain equalization. The rare-earth doped nanoparticles are incorporated inside the core of a $SiO_2$ fiber to form a gain medium for a laser or amplifier.

The high power laser operating at eye safer wavelengths near 2 μm may also be doped with nanoparticles that do not incorporate a rare-earth ion, such as $Al_2O_3$ nanoparticles. In this case the undoped $Al_2O_3$ nanoparticles may greatly increase the solubility of the rare-earth doped, low phonon energy nanoparticles in order to obtain doping levels needed for a high energy laser. The $Al_2O_3$ nanoparticles may be incorporated in the silica soot at volume fractions of from 0.01 to as high as 50%, with ideal volume fractions from 0.5 to 5%.

The high power laser may also operate in the region near 1.5-1.6 μm, also at eye safer wavelengths, where it is composed of Erbium ($Er^{3+}$) ions incorporated inside low phonon energy hosts such a $LaF_3$, giving $Er:LaF_3$, or other trivalent fluoride nanoparticles, $Er:Lu_2O_3$, $Er:Al2O3$, $Er:Ga_2O_3$, $Er:In_2O_3$, and their mixtures, and co-doped with $Al_2O_3$ nanoparticles in which the solubility of the rare earth doped nanoparticles is greatly increased in order to obtain doping levels needed for a high energy laser. This may include, for example, rare earth doping levels well beyond 90 dB/m (for Erbium ions this corresponds to $6.41 \times 10^{25}$ ions/m$^3$). Mixtures of these nanoparticle hosts may also be used, for example, to achieve a large bandwidth for gain equalization.

Although nanoparticle-doped fiber lasers and amplifiers operating at eye-safer wavelengths form one aspect of the invention, the invention is not limited to lasers and amplifiers that operate at eye-safer wavelengths. The nanoparticles, preforms, and fibers of the invention, as well as the methods for making them, may also be used to provide nanoparticle-doped fiber lasers and amplifiers that operate at non-eye-safer wavelengths, typically below 1.4 µm. For example, UV, visible, and 1 µm, as well as other wavelengths. These aspects of the invention can be achieved by doping the nanoparticles with suitable rare-earth ions, such as Yb, that do not emit at eye-safer wavelengths, and incorporating them into the core of the fiber.

Both $Er^{3+}$ and $Ho^{3+}$ nanoparticle doped fibers have been used to demonstrate lasing. Nanoparticle doping has been used to decrease the gain coefficient for SBS.

The lasers and amplifiers incorporating fibers doped with nanoparticles beneficially provide high amplifier and laser slope efficiencies. Slope efficiencies for $Er^{3+}$, for example, of greater than 65% with erbium concentrations of 40 dB/m, and slope efficiencies of 46.3% for erbium ion concentrations of 63 dB/m ($4.37 \times 10^{25}$ ions/$m^3$) have been achieved.

The invention encompasses amplifiers that include a pump source, a signal source, and gain media having a silica cladding and at least one silica core provided within the silica cladding. The core may incorporate nanoparticles formed from a material having a lower phonon energy than the silica. (Lasers may also be formed in this manner by further including filter elements to form an optical cavity that separates the pump from the signal.) The pump absorption efficiency of the gain media is increased as compared to gain media not doped with the nanoparticles.

In addition to the nanoparticles, the at least one silica core of the amplifier may optionally include co-dopant nanoparticles. In some preferred aspects, more than one type of nanoparticle may be mixed together in the gain media. In other preferred aspects, when more than one type of nanoparticle is provided, the nanoparticles may be used to form a pattern within the gain media. The pattern may consist of concentric rings radiating out from the center of the core, however, other patterns that result in little or no overlap between the optical and acoustic field may be used in accordance with the invention.

One or more rare-earth ions may be embedded in the nanoparticles, or rare-earth ions may be solution-doped into the core of the gain media. The resulting amplifier may operates at an eye-safer wavelength of greater than 1.4 µm. Alternatively, use of rare-earth ions that do not operate at eye-safer wavelengths is also envisioned.

The amplifier may beneficially exhibit reduced Stimulated Brillouin Scattering as compared to an amplifier not including the nanoparticle-doped gain media. The amplifier may also have a gain spectrum that is broadened as compared to an amplifier not including the nanoparticle-doped gain media.

In some aspects, the gain spectrum of the gain media may be tailored to avoid spectrum equalization. The nanoparticle host causes the rare earth ion to have inhomogeneous broadening of its gain. This can be accomplished by having, for example, $Er^{3+}$ doped into $Al_2O_3$, and also into $LaF_3$, and also into $Lu_2O_3$, all in one fiber.

The gain spectrum of the gain media may be equalized for different spatial modes. The nanoparticles are selectively doped into the preform and fiber in regions that interact with the different modes. The first order mode travels in the middle of the core, and the middle of the core may be doped to excite the ions. The second order mode travels in two lobes along the edges of the core and misses the middle of the core, so selectively doping along the edges (such as by forming concentric rings using different nanoparticles), results in the formation of second order modes in the fiber, thereby exciting these ions. The gain media may be a multimode gain media.

The gain media used in the amplifiers and lasers of the invention may include multiple layers of cladding, and may also include multiple cores. Where multiple cores are provided, each core may have the same nanoparticles therein, or one or more of the multiple cores may include different nanoparticles to provide unique properties for one or more of the cores. In some aspects, each of the multiple cores includes different nanoparticles.

Reduction of SBS.

Stimulated Brillouin scattering (SBS) is a major detriment to achieving high power in $SiO_2$ based fiber lasers and amplifiers. In SBS, there is an interaction of optical photons with acoustic phonons which causes the Bragg reflection of light from periodic variations produced by acoustic waves. The acoustic waves traveling in the same direction as the input light signal wave are stimulated by the high power density input signal light through electrostriction. See R. A. Motes and R. W. Berdine, "Introduction to High Power Fiber Lasers," pp. 17, Directed Energy Professional Society (2009). This induced index grating reflects the input signal light into a Doppler downshifted Stokes wave. The result is a decrease in the forward propagating signal light, and thus a reduction in output power. As with other processes, there is a strong dependence of SBS on the host media. Some active efforts to mitigate SBS focus on increasing its threshold, Pth, which is inversely proportional to a Brillouin gain coefficient $g_B$ and to an overlap between the electric field and acoustic field ($I_u^{ao}$) as given in Equation 1:

$$P_{th} \propto \frac{1}{g_B I_u^{a0}} \tag{1}$$

Therefore a decrease in the Brillouin gain coefficient or the decrease in electric and acoustic field overlap will increase the threshold for SBS. The Brillouin gain coefficient $g_B$ is given by Equation 2:

$$g_B = \frac{2\pi n^7 p_{12}^2}{c \rho \lambda_p^2 V_A \Delta v_B} \tag{2}$$

Here n is the refractive index of the host media, p is its density, $p_{12}^2$ is the media Pockels coefficient, $\lambda_p$ is the wavelength of the input light that stimulates the process, $V_A$ is the media acoustic velocity, $\Delta v_B$ is the Brillouin gain spectral width, and c is the speed of light. A decrease in $g_B$ can be accomplished by increasing the media's acoustic velocity ($V_A$), its Brillouin gain spectral width ($\Delta_{VB}$), and by decreasing its Pockels coefficient ($p_{12}^2$), which may be accomplished, for example, by adding nanoparticles in large concentrations (preferably greater than 4 mol %). Preferred nanoparticles in accordance with this aspect of the invention may be formed of $Al_2O_3$. Another effective way to increase the SBS threshold is to decrease the overlap between the optical field and the acoustic field ($I_u^{ao}$) in the $SiO_2$ fiber such that the two fields are de-coupled. These properties can all be modified through nanoparticle doping in accordance with the invention.

The spatial profile in a preform may be modified by the addition of nanoparticles to reduce overlap of the acoustic and optical modes, for example, by reducing $I_u^{ao}$ in denominator of Equation 1 (above) such that the stimulated Brillouin scattering threshold is increased. This is accomplished, for example, by using multiple core layer depositions with nanoparticle dopants in combinations of refractive index and acoustic index lowering or raising dopants, thereby forming inner and outer core layers having different refractive indices and/or acoustic indices. The nanoparticles that may be used in this aspect of the invention may include, but are not limited to, nanoparticles of $Al_2O_3$, $LaF_3$, $Lu_2O_3$, $Ga_2O_3$, $In_2O_3$, $Bi_2O_3$, and $P_2O_5$, and combinations thereof. These nanoparticles may be incorporated in the silica soot at volume fractions of from 0.01 to as high as 50%, with ideal volume fractions from 0.5 to 5%. Such a preform may also be doped with one or more Lanthanide series rare earth ions, such as Er, Ho, Tm, Yb, Pr, and Dy, and combinations thereof. The rare-earth ions may be eye-safer in some aspects of the invention, but use of rare-earth ions that do not emit in the eye-safer region of the spectrum is also encompassed by the invention.

A method for reducing stimulated Brillouin scattering (SBS) in gain media in accordance with the invention provides an inner core of a gain media that includes nanoparticles, forming an inner core having a first acoustic refractive index and a first optical refractive index. An outer core of the gain media may then be provided that includes nanoparticles, forming an outer core having a second acoustic refractive index and a second optical refractive index. The first and second acoustic refractive indices, and first and second optical refractive indices, result in reduced overlap of optical and acoustic modes within the gain media.

Preferably the first optical refractive index is higher than the second refractive index, as shown in FIG. 3. In addition, both core refractive indices are higher than the refractive index of the cladding. This enables the gain media to achieve a Gaussian (i.e., bell curve) profile throughout the core, where it is highest at the middle and decreases until it becomes the refractive index of pure silica in the cladding. In some aspects of the invention, both the first and second optical refractive indices are the same, but both are higher than the optical refractive index of the cladding.

Possible core designs include, for example, the addition of $P_2O_5$ nanoparticles in the inner core region and $Al_2O_3$ nanoparticles in the outer core region. In this case, the optical refractive index is increased in the core region in a uniform manner as needed for proper wave-guiding, but the acoustic refractive index is increased only in the inner core area and decreases sharply in the outer core area. In another manifestation, the inner core area may be doped with $Al_2O_3$ nanoparticles while the outer core area is doped with $P_2O_5$ nanoparticles. The optical refractive index is increased uniformly in the core while the acoustic index has a dip in the inner core region. FIG. 3 illustrates the reduced overlap of the optical and acoustic modes so that the SBS threshold is increased.

It has also been discovered that SBS issues may also be alleviated by rare-earth nanoparticle doping in accordance with the invention. In nanoparticle doping, Lanthanide-series rare-earth ions are surrounded by a host nanoparticle in what may be envisioned as a cage. Without wishing to be bound by theory, it is believed that the nanoparticles effectively separate the rare earth ions and shield them from the $SiO_2$ lattice. Therefore, rare earth ions that are separated are less likely to experience excited state energy interactions such as up-conversion and quenching. And because they may be encaged in a nanoparticle host that has a lower phonon energy than $SiO_2$, they are less likely to undergo multi-phonon quenching. Nanoparticles can also be selected that have a high acoustic velocity (preferably larger than 5970 m/s, which is the value for pure silica); a large Brillouin spectral width (preferably larger than 40 MHz, which is the value for SMF telecommunications fiber); a small photoelastic (or Pockels) constant that is lower than silica, and is preferably negative, such that when the nanoparticle dopant is combined with silica the resultant Pockels' coefficient for the fiber approaches zero (by additive modeling) depending on the dopant. Selection of nanoparticles based on one or more of these factors may be used to increase the SBS threshold. Nanoparticles can also be doped into the $SiO_2$ preform in a manner that is tailored across the cross section of the core, resulting in a decreased overlap between the optical and acoustic field. Finally, undoped or passive nanoparticles can be added as a co-dopant with other rare earth doped nanoparticles or along with solution doped rare earth ions to increase solubility or to tailor core/cladding refractive index profiles to optimize waveguiding properties.

Accordingly, in some aspects, the invention provides a nanoparticle doped fiber laser, or fiber amplifier, having an increased threshold for stimulated Brillouin scattering (SBS), as well as methods for reducing SBS in a fiber laser or fiber amplifier. The SBS threshold is increased by lowering the Brillouin gain coefficient.

As given in Equation 2 (above), lowering the Brillouin gain coefficient may be accomplished by selecting the nanoparticle host based on factors such as an acoustic velocity greater than silica (preferably pure silica); a Brillouin spectral width greater than silica (preferably pure silica); a refractive index approximately the same as silica (preferably pure silica); a negative Pockels' coefficient such that when combined with silica (which has a positive Pockels' coefficient) in a large enough amount the overall Pockels' coefficient for the fiber is zero, based on an additivity model; and combinations of these factors. Some suitable nanoparticle hosts to accomplish this include $Al_2O_3$, $Bi_2O_3$, $P_2O_5$, BaO, $La_2O_3/Al_2O_3$ (in combination), and $MgO/Al_2O_3$ (in combination). In some aspects, for example, a ytterbium ion solution may be co-doped with $Al_2O_3$ nanoparticles to reduce the SBS gain coefficient in a fiber laser, thereby increasing the threshold for SBS. A conventional solution doping technique may be used for ytterbium ion doping in conjunction with undoped (passive) nanoparticles added as a co-dopant to decrease the SBS gain coefficient and increase the threshold for SBS.

The SBS-reduction techniques of the invention beneficially result in a gain media that achieves a decrease in the Brillouin gain coefficient as compared to conventional gain media. The decrease is preferably at least a 150% reduction, preferably a 200% reduction, more preferably a 250% reduction in the Brillouin gain coefficient. In some preferred aspects of the invention, a 360% reduction of the Brillouin gain coefficient may be achieved. The Brillouin gain coefficient may be reduced by a factor of 10. With sufficient levels of doping of appropriate nanoparticles, the Brillouin gain coefficient may be reduced to zero. The amount of nanoparticles required to achieve a particular level of Brillouin gain coefficient reduction will vary depending on the specific nanoparticles selected, and their associated properties.

EXAMPLES

The invention will now be particularly described by way of example. However, it will be apparent to one skilled in the art that the specific details are not required in order to practice the invention. The following descriptions of specific embodiments of the present invention are presented for purposes of illustration and description. They are not intended to be exhaustive of or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated.

Example 1

Several $RE^{3+}$/NP systems were synthesized.

Er-doped $Al_2O_3$ nanoparticles were synthesized using a co-precipitation technique from aluminum (III) nitrate hydrate (Sigma-Aldrich, 99.999%) and erbium chloride (Alfa-Aesar, 99.9%). Various Al and Er molarities in the precursor solutions were investigated with the aim of obtaining molar ratios of Al:Er in the range between 10:1 and 200:1. Here, the aluminum precursor molarity was kept constant at 0.05 M, and the erbium molarity was varied from 0.005 M-0.00025 M. Thus, the Al:Er 10:1 ratio is a high molarity erbium precursor with 200:1 being low molarity [17-20]. These Al:Er ratios will dictate the amount of $Er^{3+}$ ions that are encapsulated in the aluminum oxide nanoparticles. These ratios also dictate the concentration of nanoparticles that are needed for power scaling in a fiber laser. Different synthesis techniques were investigated, where the optimum synthesis was carried out at 100° C., where the precursor salts were heated in a water bath, along with polyvinyl pyrrolidone (PVP) surfactant, and 5 M NaOH was added dropwise until a pH of 9.5 was reached. The resultant suspension was a gel-like aluminum hydroxide phase which was subsequently ripened in Teflon containers placed in an autoclave at 160° C. for 17 hours. After ripening, the suspension was centrifuged and washed 4 times in DI water and then washed twice in methanol. In order to avoiding light scattering and refractive index variations in the preform core, it is important to avoid introducing NP agglomerates into the silica soot, so the surfactant polyvinyl pyrrolidone (PVP) was used during synthesis.

The Ho-doped $Lu_2O_3$ nanoparticles were synthesized by co-precipitation of lutetium (III) nitrate hydrate (Sigma, 99.999%) and holmium chloride (Alfa, 99.9%) precursors at a molar ratio of 25:1 in the presence of PVP heated to 100° C. The pH was brought to 9.6 by adding 5M NaOH. The nanoparticles were then washed with 4 centrifugation steps of water and 2 with methanol. The resulting nanoparticles were dispersed in methanol using probe sonication.

Ho-doped and Er-doped $LaF_3$ nanoparticles were synthesized following a procedure given previously (C. Kucera, et al., "Designer emission spectra through tailored energy transfer in nanoparticle-doped silica preforms," *Opt. Lett.* 34(15):2339-2341 (2009)) by dissolving $La(NO_3)_3$ in a $NH_4F$ solution with citric acid, followed by the addition of $Ho(NO_3)_3$. The resultant dispersions were precipitated out of solution with the addition of ethanol. The resultant nanopowder was then given 4 DI water washes with centrifuging, and two with methanol, and the samples were dispersed in methanol. These nanoparticles were then loaded into the $SiO_2$ preform.

Example 2

Several NP ripening schedules were investigated.

The schedule published by A. Pastouret, et al., "Nanoparticle Doping Process for Improved Fibre Amplifiers and Lasers," Proc. SPIE 7195 (2009), which used 1 week at 95° C., led to NP dispersions with significant agglomeration consisting of both pink and white layers. The TEM image shown in FIG. 1A clearly shows the platelet structures that are attributable to Er-doped Boehmite Er:AlOOH, as well as rod-like structures which are not identified. The corresponding XRD data showed no evidence of boehmite, but clear evidence of a different Al hydroxide phase Bayerite, which is seen in both the white and pink precipitate layers. As shown in FIG. 1B, hydrothermal ripening for 1 week at 160° C. once again resulted in agglomeration and precipitation of white and pink material. Corresponding XRD data shown identified Boehmite, erbium oxide and erbium-aluminum oxide phases; the Boehmite platelets are seen in the TEM image in addition to the rods attributable to the other phases. The agreement is quite good between the XRD data and Boehmite and erbium-aluminum oxide but only weak with erbium oxide. A schedule of 17 hours at 160° C. was adopted. This schedule resulted in a dispersion that appears to contain erbium oxide and erbium aluminum oxide, as shown in FIG. 1C, although the agreement between the data and reference is not as convincing as in the other ripening cases, perhaps due to the small NP size and the presence of amorphous material. However, the corresponding XRD data did not exactly correspond to any reference phases containing Er, Al and O. Ripening for 17 h at 160° C. produced the most stable dispersions with only a small amount of precipitation. Although the ripening conditions obviously affect the nanoparticle size and morphology, any Al-oxide phase formed is able to equally encapsulate the erbium ions.

Example 3

The nanoparticle solutions were doped into the preform core in a manner similar to that used for solution doping, where the doping is performed in situ without having to remove the preform from the lathe. For preforms to be drawn into large core diameter fibers for a clad-pumped laser, multiple doping and consolidation steps were performed to achieve a multi-layer doped core. In all cases, after doping, the core was put through multiple drying stages, both in an oxygen environment and a chlorine environment, in order to drive off the solvent, OH and surfactants.

Preform consolidation and collapse stages are at temperatures of 1700-2000° C., so any oxide phases are converted to Er-doped $Al_2O_3$. With the proper selection of surfactant, synthesis temperature and pH, agglomeration can be kept to a minimum. Nine grams of the surfactant PVP (10,000 molecular weight) is dispersed in 100 ml. methanol. The Er chloride and aluminum nitrate are added to the PVP methanol solution. The solution is brought to a temperature of 100° C. Five Molar NaOH is added dropwise until a pH of 9.6 is reached. The solution is cooled and subsequently placed in a Teflon container and ripened at 160° C. for 17 hours. This is important to obtain smooth refractive index profiles and reduce scattering of light. A major accomplishment of this invention is the development of a method for incorporating large concentrations, to ~4 wt % nanoparticles into the $SiO_2$ matrix. Stimulated emission spectra indicated that the erbium peak is taller and narrower in Er—NP doped preform slices than in those prepared by solution doping.

This may be indicative of less crystal field splitting, as the erbium is in a more favorable crystalline environment as opposed to an amorphous $SiO_2$ environment.

Example 4

Spatially-resolved Er luminescence and lifetime measurements were made on polished ~0.5 mm thick preform slices using a focused spot from a 980 nm laser for excitation and measuring the luminescence with an InGaAs detector. The spatial resolution was ~25 μm.

Figure 4:
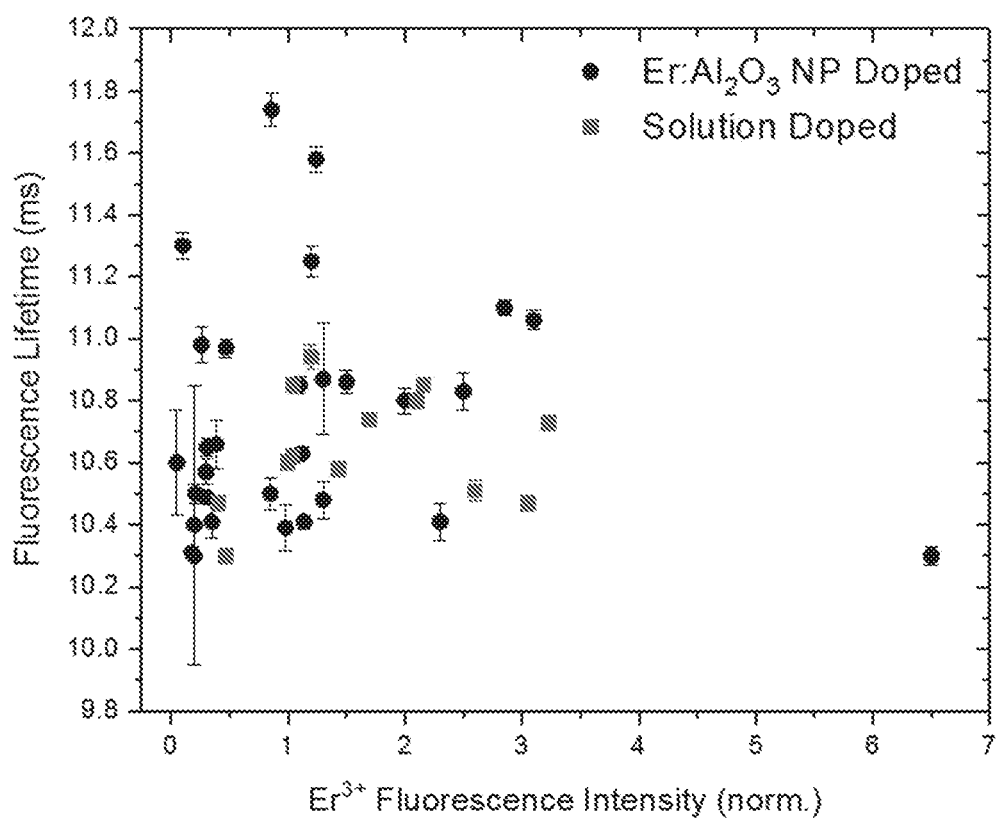
FIG. 4 is a graph comparing fluorescence lifetimes versus intensity for nanoparticle and solution doped preforms.

Fluorescence lifetime vs. intensity were measured for more than 35 NP-doped samples, and compared to solution-doped preforms, as shown in FIG. 4. Lifetimes as long as 11.7+/−0.05 ms have been observed in NP-doped preforms, and there is a general trend of longer lifetimes for the same fluorescence intensity (Er concentration) in the $Er:Al_2O_3$ NP-doped samples vs. solution-doped samples. These results indicate that excited state energy transfer mechanisms associated with lifetime quenching found in samples prepared by conventional solution doping techniques have been reduced.

Optical absorption measurements have indicated that Er peak absorptions greater than 90 dB/m at 1532 nm have been successfully obtained, and using the results of electron probe microscopic analysis (EMPA) on preform slices for calibration, this corresponds to $1.54 \times 10^{25}$ ions/$m^3$. Through cutback spectral measurements it has been determined that the background loss is very low <0.04 dB/m at 1300 nm, and in spite of the NPs being formed in an aqueous process and existing as a hydroxide phase as synthesized, and extremely low OH concentrations of ~0.3 ppm in the resultant fibers have been obtained, as measured from the second OH overtone band at 1380 nm.

test NP doped fiber. A filter on the free-space MOPA output was used to separate the amplified signal from the unabsorbed pump. The slope efficiency was determined by linearly fitting the output power vs. absorbed pump measured at each length as the fiber was cut back; the launched power was measured by cleaving the Er-doped laser fiber shortly after the splice with the SMF.

Figure 6:
FIG. 6 is a diagram illustrating a laser testing apparatus.

Clad-pumped laser investigations were performed using double clad erbium NP doped fiber which had an octagonal shaped pump cladding to enhance mode overlap and avoid doughnut modes. The glass fiber was coated with a low refractive index polymer to provide a pump cladding NA=0.46. The laser set-up is shown in FIG. 6. The fiber was resonantly pumped at 1532 nm using a commercial Er doped fiber laser. A 1605 nm fiber Bragg grating with a reflectivity of 99.5% was spliced onto the end of the test fiber and a bandpass filter was used to isolate and direct the test fiber laser output. Subsequent laser testing was done using a non-selective mirror in place of the fiber Bragg grating.

Figure 7:
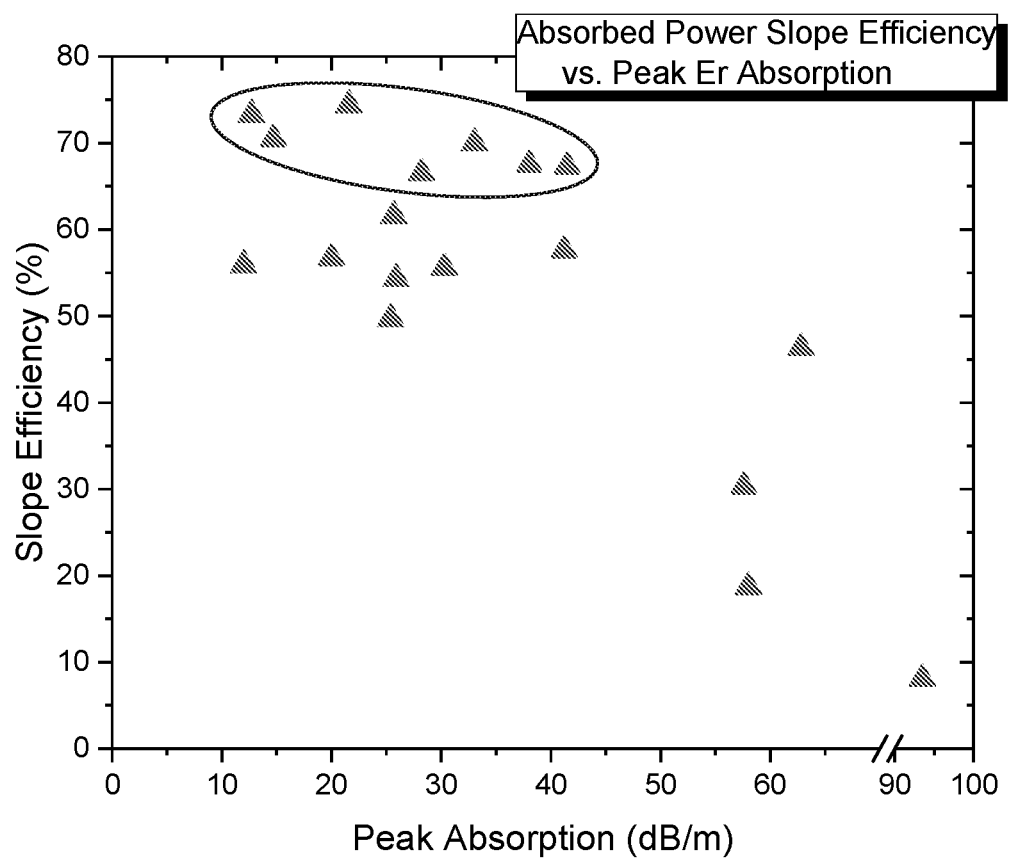
FIG. 7 is a graph plotting slope efficiency as a function of $Er^{3+}$ peak absorption for nanoparticle doped fibers.

The slope efficiency determined in the MOPA testbed for several NP-doped fibers is plotted as a function of $Er^{3+}$ peak absorption in FIG. 7. An optical-to-optical slope efficiency of 74.4% in a fiber with an $Er^{3+}$ absorption peak of 22 dB/m has been demonstrated, giving an erbium ion concentration of $1.81 \times 10^{25}$ ions/$m^3$ as determined by EMPA. This is believed to be the highest value for slope efficiency of any erbium nanoparticle doped fiber. Furthermore, high slope efficiency of 49.2% has been maintained for doping levels up to ~63 dB/m (~$4.37 \times 10^{25}$ ions/m3). In Table 1, several results for resonantly pumped amplifier and lasing efficiency for the fibers have been highlighted, and the methods used for excitation are given, i.e., core pumped MOPA or clad pumped lasing, where the fiber has an octagonal shaped pump cladding (designated as oct).

TABLE 1

| Fiber | Core/clad dia. | NP Host | Er Abs (dB/m) | Er conc (#/$m^3$) | pump | Test Method | Slope efficiency |
|---|---|---|---|---|---|---|---|
| A | 9.4/145 | $Al_2O_3$ | 22 | $1.81 \times 10^{25}$ | core | MOPA Core, gain | 74.4% |
| B | 7.8/150 | $Al_2O_3$ | 38 | $2.22 \times 10^{25}$ | core | MOPA Core, gain | 67.5% |
| C | 20/125 DC | $Al_2O_3$ | 0.9* | $1.57 \times 10^{25}$ | clad | Clad pump laser, HRM | 49.2% |
| D | 23/127 DC | $Al_2O_3$ | 0.8* | $2.49 \times 10^{25}$ | clad | Clad pump laser, Bragg | 53.0% |
| E | 10/125 | $LaF_3$ | 10.75 | $4.27 \times 10^{24}$ | core | MOPA Core, gain | 71.4% |

Example 5

Fibers were drawn from the preforms on a silica draw tower, and broadband spectral measurements from 600 to 1700 nm were made with a Photon Kinetics FOA-2000 fiber measurement system. An Agilent 83437A EELED source and Ando AQ6315 OSA with 0.5 μm resolution were used to measure the Er peak absorption near 1530 nm, and spectral measurements in the 1650-2250 nm range were made with a Yokogawa AQ6375B long wavelength Optical Spectrum Analyzer and either a NKT SuperK COMPACT supercontinuum or an AdValue Photonics AP-ASE-2000 superluminescent source. Fiber refractive index profiles were carried out using an Interfiber Analysis IFA 100 fiber index profiler.

Laser amplifier performance was evaluated for single mode erbium doped fibers with a core pumped master oscillator-power amplifier (MOPA) test bed using a pump wavelength of 1476 nm (0-300 mW) and a 7 mW signal at 1560 nm. The pump and signal were combined in a wavelength division multiplexer whose output was spliced to the The highest efficiency occurred for a ratio of Al:Er precursor molarities of 50:1, where this ratio represents a low molarity erbium precursor, highlighted in the figure by the circled data points. As discussed, scaling up $Er^{3+}$ concentrations is required for high power lasing, both to minimize the active fiber length to reduce nonlinear processes and because of the areal dilution in cladding-pumped configurations. Using low molarity dispersions requires very high loadings of nanoparticles in the fiber. Earlier attempts at increasing the concentration of erbium in the fibers were focused on increasing the Er precursor molarity (while maintaining the same Al molarity, thus decreasing the Al:Er ratio) where solutions with Al:Er of 20:1 or 10:1 were used. The data indicate that these lower ratios lead to lower slope efficiencies because the erbium concentration in the precursor solution was too high. This could have several detrimental effects during synthesis, such as the formation of clusters of erbium within the NP host, or the formation of separate erbium oxide nanoparticles along with Al—OH nanoparticles as shown in FIGS. 1A-1C. By decreasing the amount of erbium in the precursor, to a ratio of 50:1, there is a better opportunity to encapsulate and isolate erbium ions so that they do not suffer these detrimental effects.

Ideally, the highest ratio of Al:Er possible would be needed to completely ensure the isolation of $RE^{3+}$ ions within the nanoparticle host. A ratio for Al:Er precursor concentration as high as 350:1 may be needed. The investigations began with an Al:Er precursor molarity ratio of 200:1. But in order to have a high enough concentration of rare earth ions to realize a high power laser, that would entail packing doped nanoparticles into the $SiO_2$ at concentrations higher than can be held by the silica matrix, and so devitrification would occur. Therefore, the 50:1 Al:Er ratio represents a compromise between the maximum concentration of nanoparticles that can be incorporated and being able to incorporate as many erbium ions as possible for lasing. While this ratio results in a relatively high concentration of aluminum in the fiber, the concentration is still lower than for solution doping.

The highest slope efficiency NP doped sample had an Al:Er ion ratio of ~60 in the preform vs. Al:Er=50 in the precursor. In contrast, a typical solution doped preform may have a Al:Er ion ratio of >150. These concentrations are important for waveguide control since increased $Al_2O_3$ concentrations results in a high refractive index, which will compromise single mode guidance in large mode area fibers (or require complicated pedestal structures). Furthermore, a ratio of Al:Er this high in a solution-doped preform would be highly quenched. There is much less excess Al in NP-doped fibers because the only Al incorporated into the preform is through Al—O nanoparticles.

$Al_2O_3$ nanoparticles have also been used as an additive for refractive index control, where they may be used as a co-dopant along with $RE^{3+}$ doped NPs to raise the core refractive index. This is a desirable alternative to doping with germanium in the preform soot, which can lead to "burn out" in the core, thus giving a large "dip" on the centerline in the fiber refractive index profile. This dip in the refractive index profile also corresponds to a reduced level of rare earth dopants. The rare earth dopant should ideally be at its greatest concentration where the mode field is at its most intense, i.e., in the center of the fiber core. This is shown in FIG. 5, which plots the preform refractive index profile and corresponding spatially-resolved luminescence intensity. It is evident the $Er^{3+}$ ions are very well distributed through the preform core.

Figure 8:
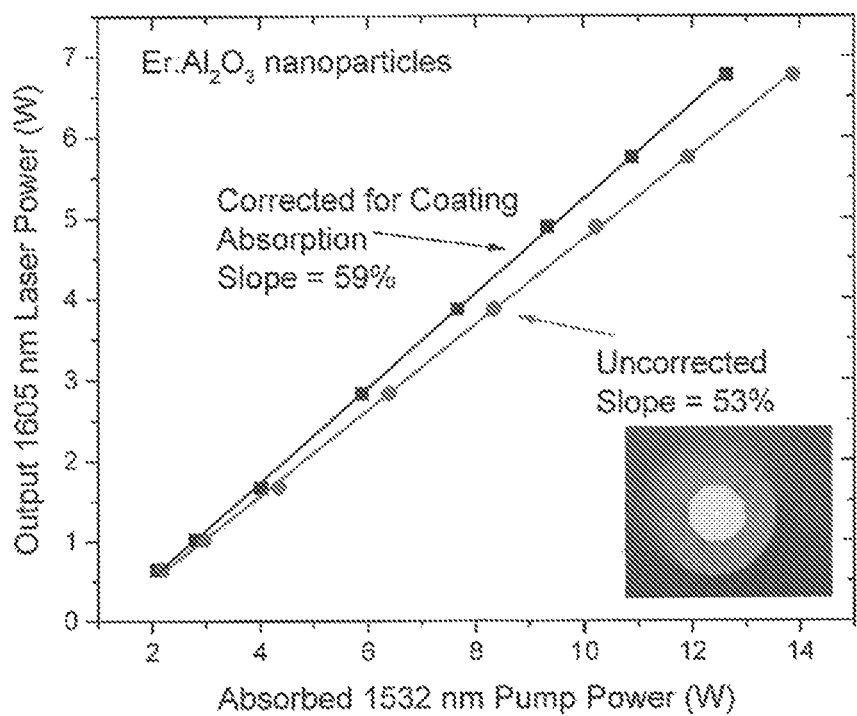
FIG. 8 is a graph comparing corrected and uncorrected slope efficiencies of a resonantly-pumped, dual-clad fiber containing $Er:Al_2O_3$ nanoparticles. An octagonal pump cladding is shown in the inset photograph.
Figure 9:
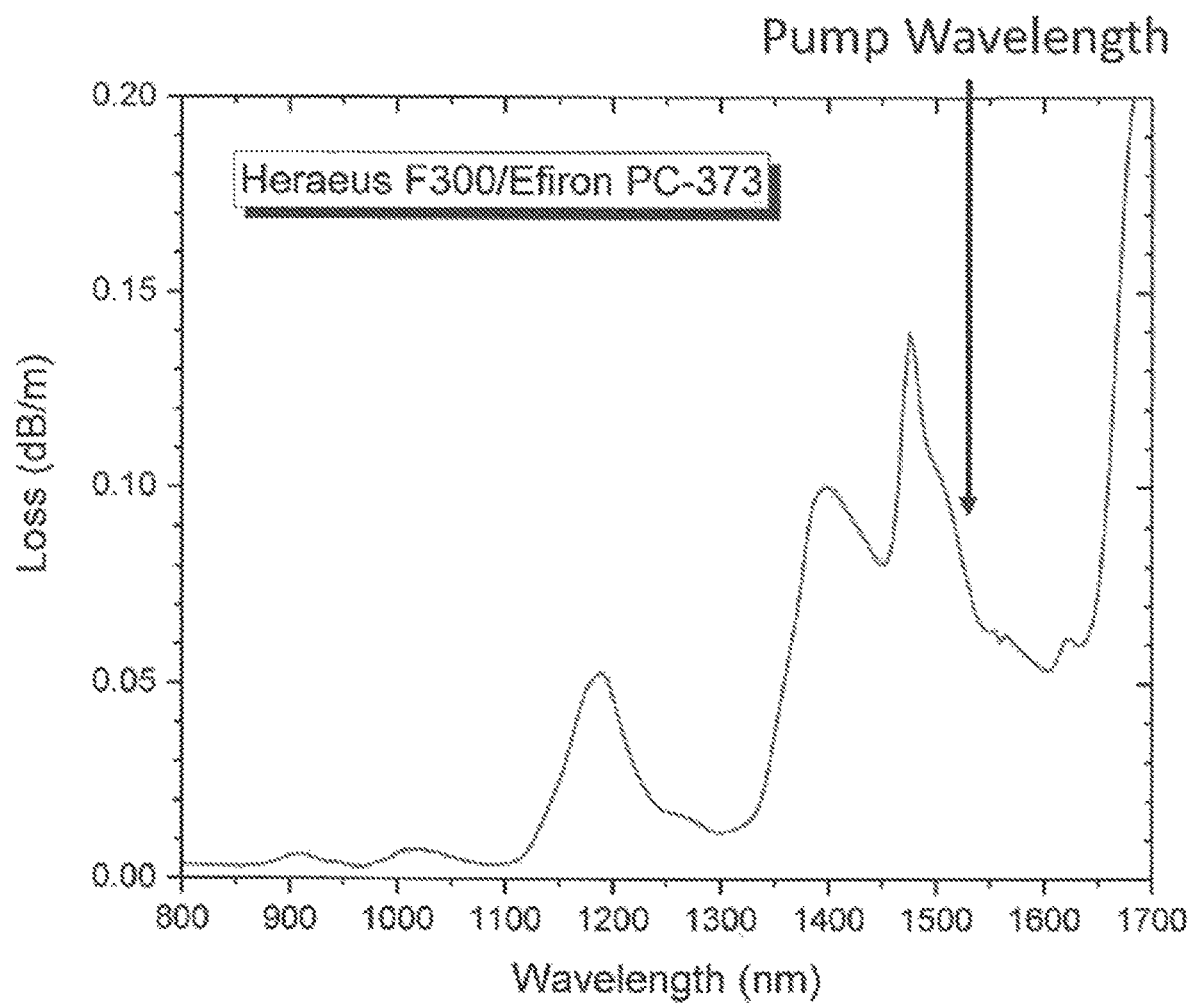
FIG. 9 is a graph showing the low index polymer coating absorption spectrum when drawn on a pure silica fiber, showing significant absorptions above 1100 nm, and a loss of 0.08 dB/m at 1532 nm.

In order to perform clad pumped laser experiments, the core diameter was increased by depositing multiple core layers using multiple nanoparticle doping and consolidation steps. It was also necessary to obtain optimal overlap of pump and signal light in the core, and so the outer diameter of an Er—NP doped core preform was ground and polished into an octagonal cross section and drawn into fiber. The target core and cladding flat-to-flat diameters were 20 and 125 μm, respectively, to match the dimensions of the passive components in the test setup. However, the actual drawn core diameter was 23 μm and the cladding flat-to-flat distance was 127 μm, which caused some splice loss. The lasing results are presented in FIG. 8, along with an image of the octagonal end-face of the fiber. Clad pumped lasing results are also summarized in Table 1. An optical-to-optical slope efficiency of 53% was measured for this fiber. It is important to note that there is significant loss at the 1532 nm pump wavelength due to absorption in the low index polymer coating used as the pump cladding, as shown in FIG. 9. These low index coatings are designed for use with Yb-doped fiber lasers, generally to be pumped near 975 nm, but there are significant absorptions >1100 nm, and the loss at 1532 nm is 0.08 dB/m, as shown by the arrow in FIG. 9. When the polymer loss is taken into account, the theoretical slope efficiency of the Er—NP-doped fiber laser increases to 59%, as shown in FIG. 8.

Further improvement could be achieved with either an air-clad design or improved polymer coatings of lower absorption. Note that the slope efficiency of an Er—NP-doped single mode fiber made with a similar NP dispersion measured in the core-pumped MOPA was 67%, so the clad pumped results are quite encouraging, especially considering the splice loss. This is believed to be the first demonstration of efficient clad-pumped lasing in an erbium nanoparticle doped fiber.

Example 6

The holmium NP doped fibers were resonantly core-pumped by a single mode 1.95 μm thulium doped fiber laser pump; the laser cavity was formed by a 2.09 μm high reflector fiber Bragg grating and the 4% Fresnel reflection of the cleaved fiber end. A dichroic mirror was used to split the residual pump and signal power, and the cutback method was used to determine efficiency vs. fiber length.

As discussed above, multiphonon lifetime quenching is a significant issue for Ho-doped silica fibers due to the large phonon energy of the silica matrix. Encapsulating the $Ho^{3+}$ ions in a NP of low phonon energy might be a way to shield the ion from the silica matrix, thereby reducing quenching. Initial efforts with holmium NP doping have included both $Ho:LaF_3$ and $Ho:Lu_2O_3$ NP systems, which are attractive hosts due to their low phonon energies. Lifetime measurements were made on polished preform samples ~3 cm in length using a nanosecond 1.95 μm pump and detection from the side of the preform through a 2120 nm filter with 100 nm bandpass. In Table 2, lifetime results are summarized, along with slope efficiencies measured for fibers drawn from these preforms. Measurements on both $Ho^{3+}$ solution doped and the $Ho:LaF_3$ NP preforms indicate that there is an increase of up to 33% in lifetime with NP doping. $Ho:Lu_2O_3$ NP-doped samples without the core scatter may show improved lifetime results. As with erbium NP doping it may be advantageous to use low phonon energy oxide NP hosts.

TABLE 2

| Fiber | Core/clad dia. | NP host | Lifetime (ms) | Ho Abs. (dB/m) | Ho Conc. (#/m³) | Slope Eff. |
|---|---|---|---|---|---|---|
| F | 10/111 | solution | 0.62 | 51 | $3.66 \times 10^{25}$ | 60-80% |
| G | 10/123 | $LaF_3$ | 0.83 | 26 | $2.86 \times 10^{25}$ | 82.3% |
| H | 10.5/125 | $LaF_3$ | 0.68 | 42 | $4.51 \times 10^{25}$ | 62.5% |
| I | 9.9/125 | $LaF_3$ | 0.74 | 97 | $9.18 \times 10^{25}$ | 30.0% |
| J | 10/100 | $Lu_2O_3$ | ** | 7 | $1.29 \times 10^{25}$ | 85.2% |

Figure 10:
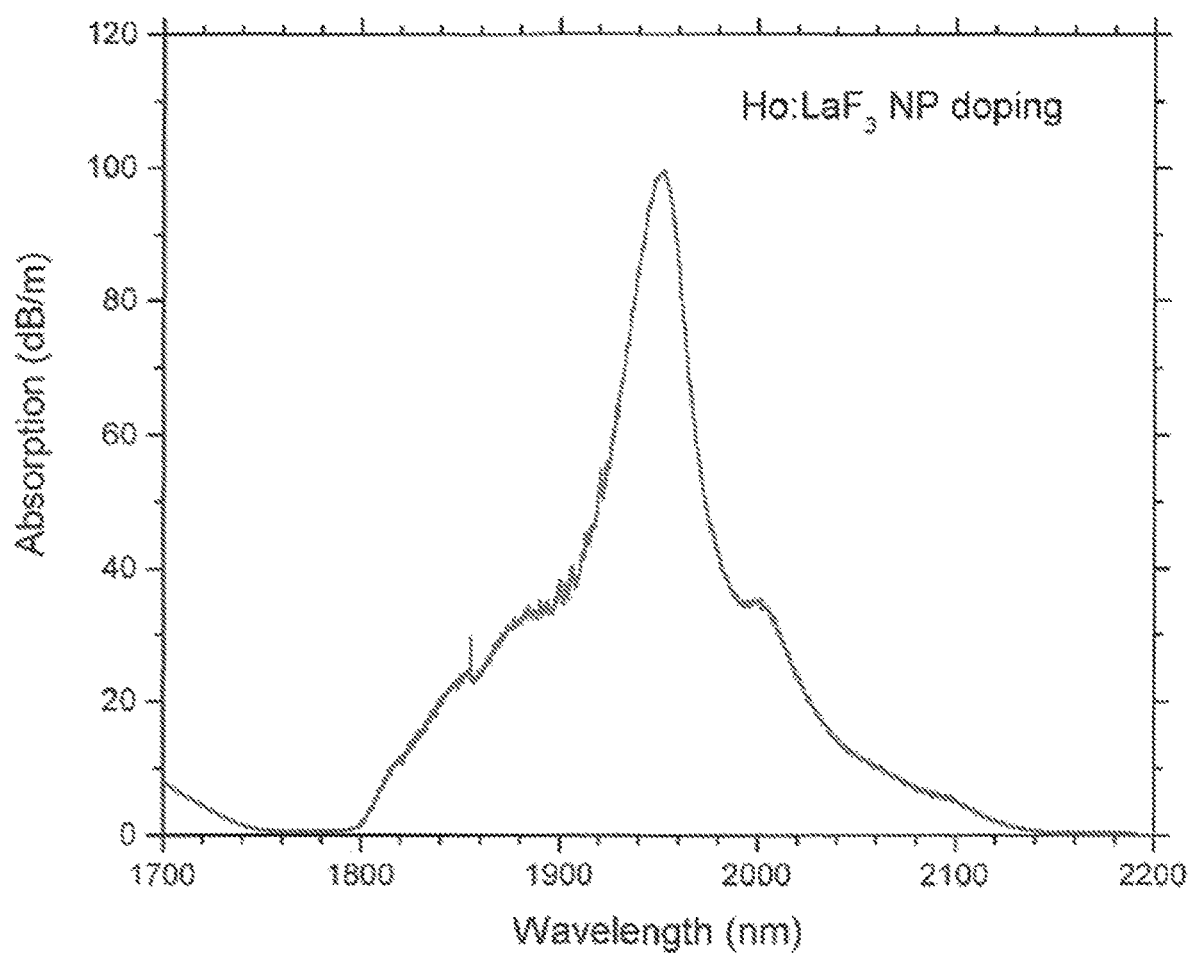
FIG. 10 is a graph showing the Ho absorption in the 2 wavelength region.

Fibers with a very low background losses of 0.02 dB/m at 1450 nm have been drawn, and the height of the second Si—OH overtone band at 1380 nm indicates that <0.5 ppm OH contamination in the fibers has been maintained. FIG. 10 shows the Ho absorption in the 2 μm wavelength region; in other measurements that extend beyond 2200 nm, there is an absence of any significant absorption at 2210 nm from the Si—O—H combination band since the OH concentration was so low.

Figure 11:
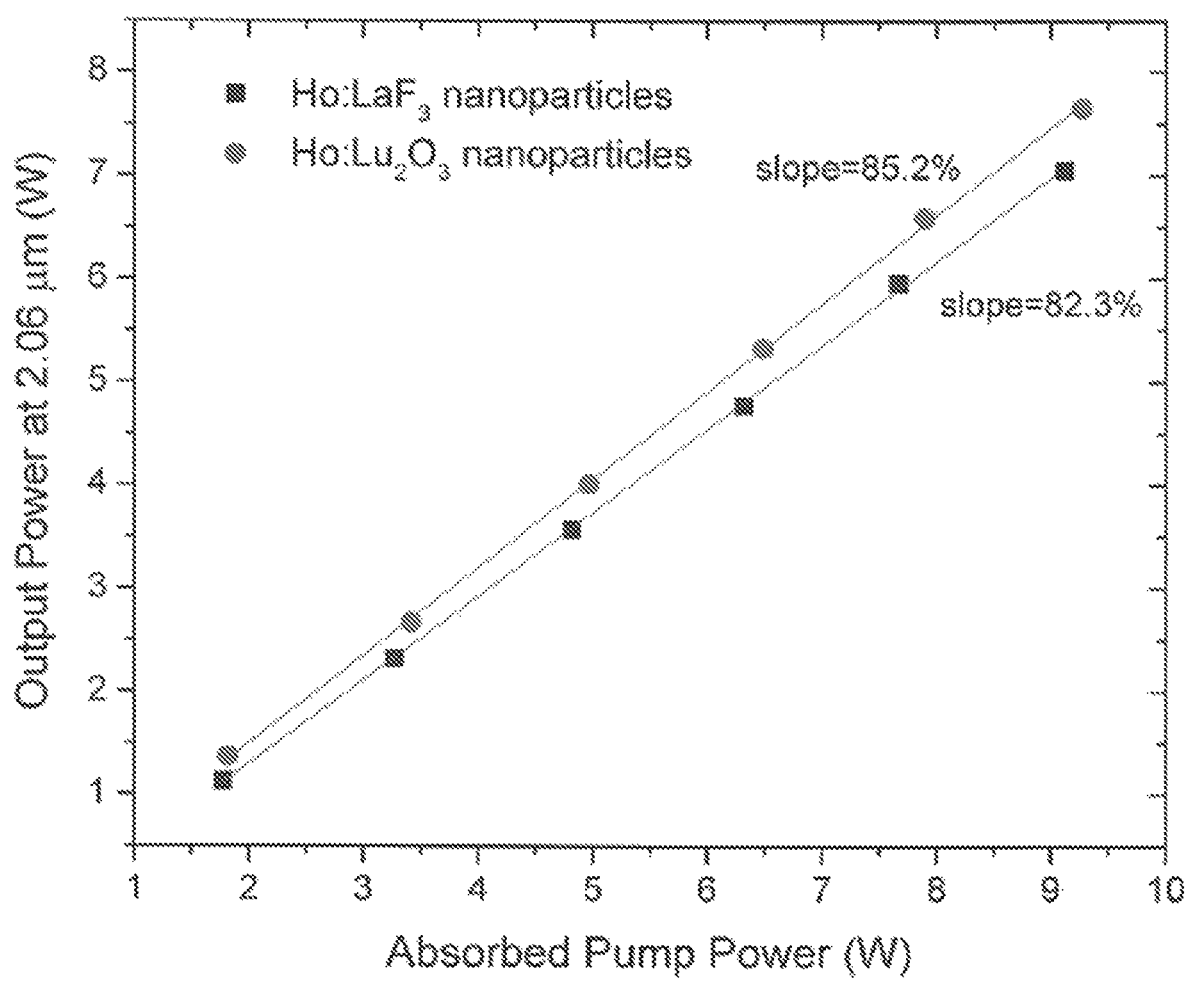
FIG. 11 is a graph showing the slope efficiency for single mode fibers doped with $Ho:LaF_3$ nanoparticles and $Ho:Lu_2O_3$ nanoparticles.

FIG. 10 shows that the pump wavelength of 1.95 μm for laser measurements is at the peak of the $Ho^{3+}$ absorption spectrum while there is very little absorption at the laser wavelength of 2.09 μm. Cutback measurements were made to obtain the maximum slope efficiency for the $Ho:LaF_3$ single mode nanoparticle doped fiber shown in FIG. 11. The Ho$^{3+}$ absorption peak for this fiber was measured to be 26.25 dB/m, corresponding to a Ho$^{3+}$ ion concentration of 2.86×10 25 ions/m3, and the maximum slope efficiency was measured to be 82.3%, as shown in FIG. 11.

Although there was excessive scatter in the Ho:Lu$_2$O$_3$ nanoparticle doped preform, the background loss in fiber drawn from this preform was only 0.016 dB/m. This difference could be due to the fact that different sections of preform were used for the lifetime measurements and fiber drawing (although there was no obvious scattering from the core in either case) or the rapid thermal quenching that occurs during fiber drawing preventing the formation of scattering centers. The slope efficiency measured in this fiber was very high, 85.2%, as shown in FIG. 11. This fiber had a holmium absorption peak measured to be 7 dB/m at 1950 nm, corresponding to a Ho$^{3+}$ ion concentration of 1.29×10$^{25}$ ions/m3. These results are very encouraging, as the demonstrations of lasing in both Ho:LaF$_3$ and Ho:Lu$_2$O$_3$NP-doped fibers are the first time for any Ho$^{3+}$ doped NP system.

Example 7

Since the Al incorporated into NPs is in a different environment from that in the silica matrix in solution-doped fibers, it is hypothesized that there might be a difference in SBS threshold. A pump-probe setup was used to investigate SBS in Er/Al doped fibers, including both NP- and solution-doped, and investigated the effects of nanoparticle doping as compared to commercial Yb$^{3+}$ doped fiber. Measurements of all fibers were made at 1064 nm, both because the pump-probe setup operated at this wavelength and SBS in the Yb-doped fiber was well-characterized. The results are summarized in Table 3.

TABLE 3

| Fiber | Doping method | Al$_2$O$_3$ conc. Wt. % | $v_B$ GHz | $g_B$ × 10$^{-11}$ m/W | $\Delta v_B$ MHz |
|---|---|---|---|---|---|
| SBS1 | NP | 4.98 | 16.65 | 0.67 | 101 |
| SBS2 | NP | 3.99 | 16.55 | 0.73 | 114 |
| SBS3 | NP | 0.228 | 16.31 | 1.73 | 42 |
| S | Solution | 5.853 | 16.61 | 2.37 | 92 |
| Commercial Yb | Solution | | 15.9 | 2.5 | 40 |

In all cases a positive Brillouin shift was observed vs. silica (Table 3) which may be due to the alumina in the nanoparticles. For pure SiO$_2$ the frequency shift is ~11 GHz, and the bandwidth for the SBS peak is ~40 MHz near 1.06 μm, and for Yb-doped SiO$_2$ the frequency shift is 16.3 GHz. The lowest Brillouin gain coefficient for the NP-doped fiber is estimated to be 1×10$^{-11}$ m/W. This is a decrease from ~2.5×10$^{-11}$ m/W for the Yb-doped fiber, and a decrease from 2.37×10$^{-11}$ for the solution doped Er/Al fiber. Even though the Al$_2$O$_3$ concentration is in fact greater in the Er/Al solution-doped sample than in the NP doped fiber samples, the Brillouin gain coefficient is lower and the Brillouin bandwidth is greater in the NP samples.

The largest Brillouin bandwidth for the NP-doped fiber was ~114 MHz, as compared with ~50 MHz for commercial Yb$^{3+}$ doped fiber, and 47 MHz for erbium solution doped fiber (Table 3). These Brillouin gain coefficients and spectral widths represents a 2.5× improvement in the threshold for SBS over commercial solution-doped fiber. Al$_2$O$_3$ has an acoustic velocity of ~10,013 m/s and a Brillouin spectral width of 287 MHz (measured at 11 GHz), which can result in a significant decrease in the Brillouin gain coefficient.

These values should be compared with silica, which has an acoustic velocity of 5970 m/s and a spectral width of 21.4 MHz (measured at 11 GHz). The NP doped fiber sample with the lowest Brillouin gain coefficient had an Al$_2$O$_3$NP loading of ~4 wt. %, but the erbium solution doped fiber actually had a higher aluminum oxide content of 5.9 wt. %. Here the aluminum is added as an Al chloride salt in solution, and so the nature of its conversion to oxide during the preform consolidate and collapse process may differ than the oxide phase that occurs in the NP doped fibers.

Example 8

Figure 12A:
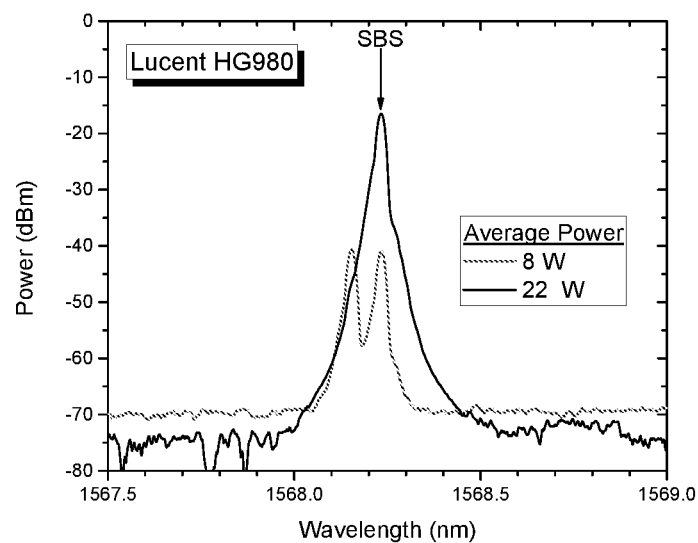
FIGS. 12A-12B are graphs comparing the SBS and Raleigh backscattering peaks in a commercially available Erbium solution doped fiber (FIG. 12A) and $Er:Al_2O_3$ nanoparticle doped fibers (FIG. 12B).
Figure 12B:
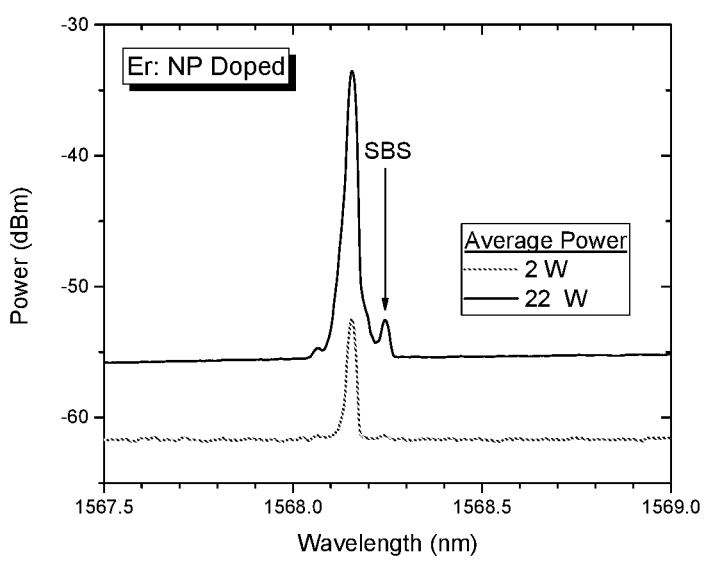

This example provides Stimulated Brillouin Scattering results for a fiber doped with Er:Al$_2$O$_3$ nanoparticles and compares them to a commercial fiber doped in the conventional solution doping manner. The preform was fabricated by impregnating a dispersion of Er:Al$_2$O$_3$ nanoparticles into the core soot of the preform. After doping, the nanoparticles were dried and calcined in situ in the preform on the lathe. The preform was subsequently consolidated and collapsed on the lathe and then drawn into a fiber. In FIGS. 12A and 12B, the SBS and Raleigh backscattering peaks for a commercial Erbium solution doped fiber along with an Er:Al$_2$O$_3$ nanoparticle doped fiber are given. The peaks were obtained with pulsed 1568.15 nm excitation and an Optical Spectrum Analyzer to detect backscattered Rayleigh and Brillouin-shifted Stokes power. Two peaks are evident in the commercial fiber at low power, see FIG. 12A, one peak for backscattered Rayleigh light (shorter wavelength), and a second peak for the Brillouin-shifted Stokes light. At increased power there is only one peak, indicating that all the incident power has been converted to SBS in this fiber. In the nanoparticle-doped fiber, at low power only the Rayleigh scattered peak is evident. See FIG. 12B. At higher power the Rayleigh scattered peak is dominant and only a small amount of SBS is evident. By comparing the two fibers it is evident that the SBS process is reduced in the nanoparticle doped fiber.

Example 9

Figure 13:
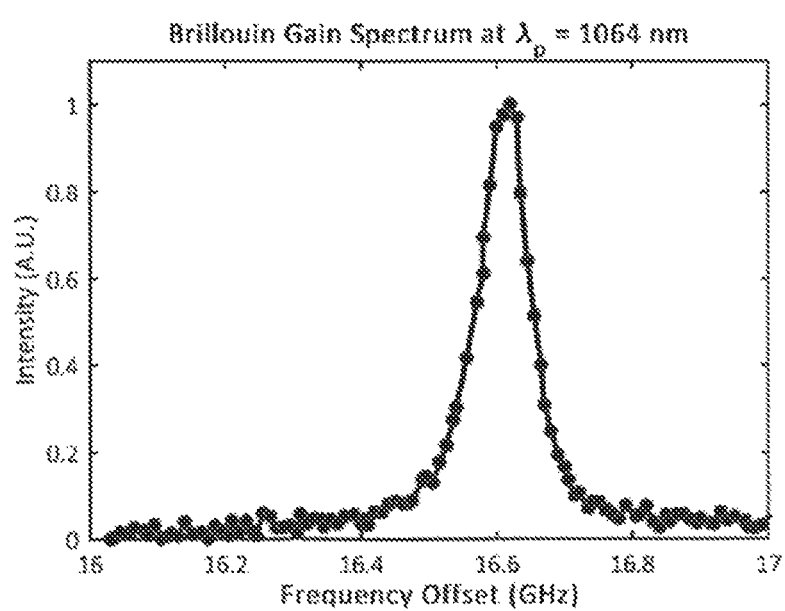
FIG. 13 is a graph of the Brillouin Gain Spectrum for the $Er:Al_2O_3$ nanoparticle doped fiber of FIG. 12B.

In order to quantify the SBS effects shown in FIG. 12B, a pump-probe experiment was conducted at 1064 nm. Two non-planar ring oscillators (NPRO) with nominal linewidths on the order of KHz were used in the setup as the pump and probe (Stokes) laser sources. Further amplification of these sources was achieved through the utilization of two amplifiers. Frequency tuning of the probe NPRO was accomplished by slowly modulating the temperature of the Nd:YAG crystal. The measured Brillouin gain spectrum (BGS) is shown in FIG. 13. There is a positive Brillouin shift vs. silica due to the alumina in the nanoparticles, which caused a higher acoustic velocity in the fiber core. At 16.6 GHz, this shift is ~300 MHz greater than that for fused silica at 1064 nm. The measured spontaneous Brillouin gain bandwidth was ~100 MHz; a 2.5× increase over that of fused silica at this wavelength. The Brillouin gain coefficient is estimated to be 1×10$^{-11}$ m/W. This is a significant decrease from ~2.5×10$^{-11}$ m/W, which is typical for a commercially available Yb-doped fiber.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed:

1. A method for doping a silica preform, comprising:
    forming a cladding layer by flowing $SiCl_4$ and $O_2$ gas into a substrate tube that is heated to a first temperature where the $SiCl_4$ and $O_2$ gas react to form the cladding layer;
    forming a silica core soot by flowing $SiCl_4$ and $O_2$ gas into the substrate tube with the cladding layer where the substrate tube with the cladding layer is heated to a second temperature, lower than the first temperature;
    soaking the silica core soot in a dispersion that includes nanoparticles doped with rare-earth ions;
    drying the silica core soot; and
    consolidating the silica core soot and the nanoparticles doped with rare-earth ions to form a consolidated doped core layer,
    wherein the nanoparticles have a smaller phonon energy than silica.

2. The method of claim 1, further comprising:
    forming a second silica core soot on the consolidated doped core layer;
    soaking the second silica core soot in another dispersion that includes second nanoparticles;
    drying the second silica core soot; and
    consolidating the second silica core soot and the second nanoparticles to form a second consolidated core layer on the consolidated doped core layer.

3. The method of claim 1, wherein the nanoparticles form a low phonon energy cage around one or more of the rare-earth ions.

4. The method of claim 1, wherein the rare-earth ions are incorporated into the nanoparticles.

5. The method of claim 1, wherein the rare-earth ions include $Ho^{3+}$.

6. The method of claim 1, wherein the rare earth ions include $Tm^{3+}$.

7. The method of claim 1, wherein the dispersion further includes second nanoparticles that do not include rare-earth ions.

8. The method of claim 2, wherein the other dispersion includes third nanoparticles that do not include rare-earth ions.

9. The method of claim 1, wherein the nanoparticles are $Lu_2O_3$.

10. The method of claim 2, wherein the nanoparticles are $Lu_2O_3$.

* * * * *